US007523117B2

(12) United States Patent  (10) Patent No.: US 7,523,117 B2
Zhang et al.  (45) Date of Patent: Apr. 21, 2009

(54) METHOD FOR DATA CLUSTERING AND CLASSIFICATION BY A GRAPH THEORY MODEL—NETWORK PARTITION INTO HIGH DENSITY SUBGRAPHS

(75) Inventors: Cun-Quan Zhang, Morgantown, WV (US); Yongbin Ou, Morgantown, WV (US)

(73) Assignee: West Virginia University Research Corporation, Morgantown, WV (US)

( * ) Notice: Subject to any disclaimer, the term of this patent is extended or adjusted under 35 U.S.C. 154(b) by 203 days.

(21) Appl. No.: 11/416,766

(22) Filed: May 3, 2006

(65) Prior Publication Data

US 2006/0274062 A1 Dec. 7, 2006

Related U.S. Application Data

(60) Provisional application No. 60/677,655, filed on May 4, 2005.

(51) Int. Cl.
*G06F 17/00* (2006.01)
(52) U.S. Cl. .............................. 707/100; 707/1; 707/4; 707/103 R; 706/20; 345/420
(58) Field of Classification Search ........................ None
See application file for complete search history.

(56) References Cited

U.S. PATENT DOCUMENTS

| 5,040,133 | A |   | 8/1991  | Feintuch et al. |
|-----------|---|---|---------|-----------------|
| 5,263,120 | A |   | 11/1993 | Bickel          |
| 5,555,196 | A |   | 9/1996  | Asano et al.    |
| 5,703,959 | A | * | 12/1997 | Asano et al. ................ 382/133 |
| 5,710,460 | A | * | 1/1998  | Leidy et al. ................. 257/752 |
| 5,745,749 | A |   | 4/1998  | Onodera et al.  |
| 5,822,218 | A | * | 10/1998 | Moosa et al. .................. 716/4 |
| 5,832,182 | A | * | 11/1998 | Zhang et al. .................. 706/50 |
| 5,864,845 | A |   | 1/1999  | Voorhees et al. |
| 5,940,832 | A | * | 8/1999  | Hamada et al. ............. 707/100 |
| 5,971,596 | A | * | 10/1999 | Nishikawa ................... 716/10 |
| 6,003,029 | A |   | 12/1999 | Agrawal et al.  |

(Continued)

OTHER PUBLICATIONS

Tutte, W.T., *J. London Math. Soc.*, 36 (1961) p. 221-230.

(Continued)

*Primary Examiner*—Khanh B Pham
*Assistant Examiner*—Andalib F Lodhi
(74) *Attorney, Agent, or Firm*—Gifford, Krass, Sprinkle, Anderson & Citkowski, P.C.

(57) ABSTRACT

A computer based method is provided for clustering related data representing objects of interest and information about levels of relatedness between objects. A weighted graph G is established on a computer. The graph has vertices and weighted edges joining pairs of vertices. Using the computer, the method finds all possible subgraphs H of G satisfying the following dynamic "edge-to-vertex" ratio:

$$\min_{\forall P} \frac{|E(H/P)|}{|P|-1} > k$$

where the minimum is taken over all possible partitions P of the vertex set of H, and E(H/P) is the set of edges crossing between parts of P. The subgraphs H found are identified as a level-k community if they are maximal, which means that there are no larger subgraphs containing it that satisfy the dynamic "edge-to-vertex" ratio for the same k. All level-k communities are output.

24 Claims, 14 Drawing Sheets

U.S. PATENT DOCUMENTS

| | | | |
|---|---|---|---|
| 6,038,557 A * | 3/2000 | Silverstein | 707/1 |
| 6,049,797 A | 4/2000 | Guha et al. | |
| 6,092,072 A | 7/2000 | Guha et al. | |
| 6,134,541 A | 10/2000 | Castelli et al. | |
| 6,195,659 B1 | 2/2001 | Hyatt | |
| 6,269,376 B1 | 7/2001 | Dhillon et al. | |
| 6,353,832 B1 | 3/2002 | Acharya et al. | |
| 6,381,605 B1 | 4/2002 | Kothuri et al. | |
| 6,397,166 B1 | 5/2002 | Leung et al. | |
| 6,466,946 B1 | 10/2002 | Mishra et al. | |
| 6,487,546 B1 | 11/2002 | Witkowski | |
| 6,505,205 B1 | 1/2003 | Kothuri et al. | |
| 6,584,456 B1 | 6/2003 | Dom et al. | |
| 6,640,227 B1 | 10/2003 | Andreev | |
| 6,643,629 B2 | 11/2003 | Ramaswamy et al. | |
| 6,684,177 B2 | 1/2004 | Mishra et al. | |
| 6,728,715 B1 | 4/2004 | Astley et al. | |
| 6,751,621 B1 | 6/2004 | Calistri-Yeh et al. | |
| 6,829,561 B2 * | 12/2004 | Keller et al. | 702/179 |
| 2002/0091667 A1 * | 7/2002 | Jaipuria et al. | 707/1 |
| 2003/0224344 A1 * | 12/2003 | Shamir et al. | 435/4 |
| 2004/0059521 A1 * | 3/2004 | Han et al. | 702/19 |
| 2004/0267686 A1 * | 12/2004 | Chayes et al. | 707/1 |
| 2005/0111386 A1 | 5/2005 | Jain et al. | |

OTHER PUBLICATIONS

Nash-Williams, C. St. J. A., *J. London Math. Soc.*, 36 (1961) p. 445-450.

Zhang, C.Q.: "*Integer Flows and Cycle Covers of Graphs*," (1997) Marcel Dekker Inc., New York, ISBN 0-8247-9790-6.

* cited by examiner

1st Spanning Tree        unused edges

OUTPUT CLUSTERS

| Level 0 | Level 1 | Level 2 | Level 3 |
|---|---|---|---|
| {a,b,c,d,e} | {a,b,c} | {a,b,c} | {a,b,c} |
| | {d,e} | {d} | {d} |
| | | {e} | {e} |

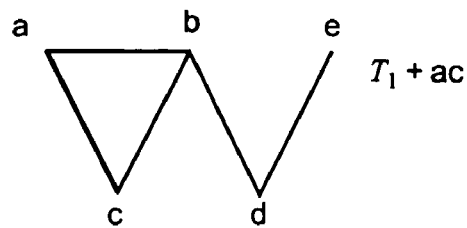 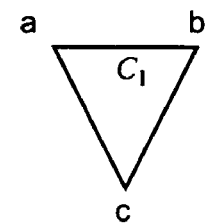
FIG - 17  FIG - 18
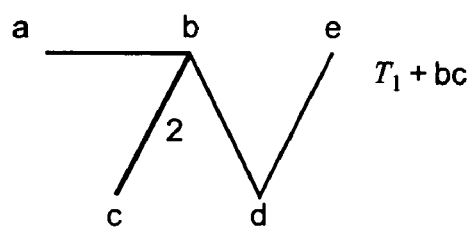 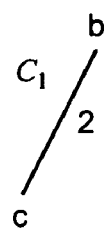 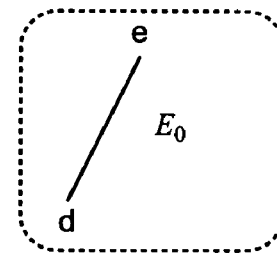
FIG - 19  FIG - 20  FIG - 21
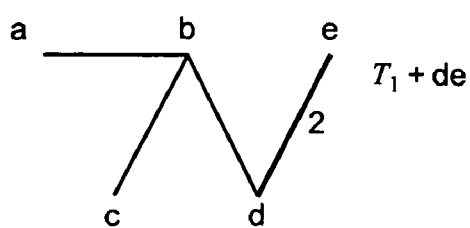  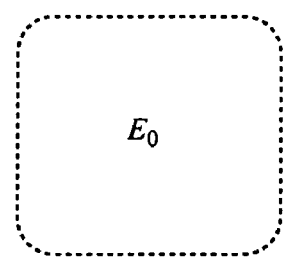
FIG - 22  FIG - 23  FIG - 24

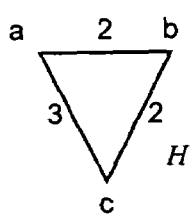
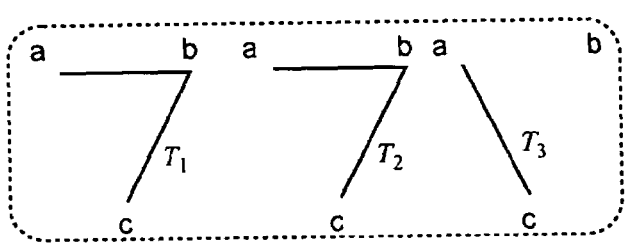
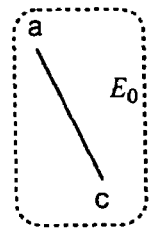
FIG - 33    FIG - 34    FIG - 35
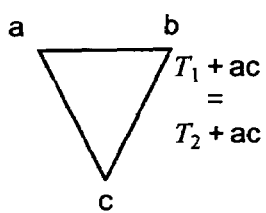
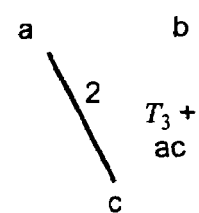
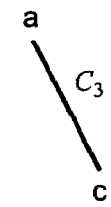
FIG - 36    FIG - 37    FIG - 38
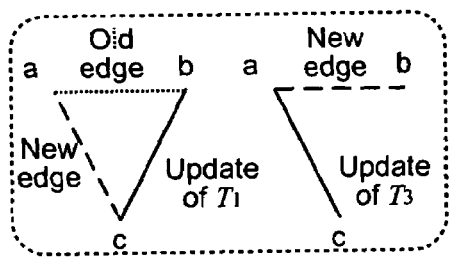
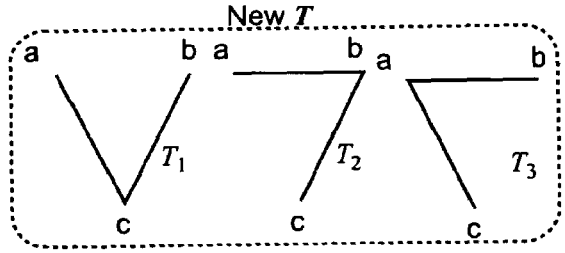
FIG - 39    FIG - 40

METHOD FOR DATA CLUSTERING AND CLASSIFICATION BY A GRAPH THEORY MODEL—NETWORK PARTITION INTO HIGH DENSITY SUBGRAPHS

REFERENCE TO RELATED APPLICATION

This application claims priority to U.S. Provisional Patent Application Ser. No. 60/677,655, filed May 4, 2005, the entire content of which is incorporated herein by reference.

STATEMENT OF GOVERNMENT RIGHTS

Research carried out in connection with this invention was supported in part by National Security Agency Grant Nos. MDA904-01-1-0022 and MSPR-03G-023. Accordingly, the United States government may have certain rights in the invention.

REFERENCE TO COMPUTER PROGRAM LISTING APPENDIX

This application includes a computer program listing appendix on two duplicate compact discs. Each compact disc includes a single file named "clustering.txt," created May 1, 2006. The program listing is in C++ language and the size of the file is 57 kilobytes. The contents of the computer program listing appendix are hereby incorporated herein by reference.

FIELD OF THE INVENTION

The present invention relates to methods, processes and systems for working with and analyzing data sets and, more specifically, for clustering a data set into subsets of closely related objects.

BACKGROUND OF THE INVENTION

Many applications require partitions of a large graph/network into smaller communities. Qualitatively, a community is defined as a subset of vertices within the graph such that connections between the vertices are denser than connections with the rest of the network. The detection of the community structure in a network is generally intended as a procedure for mapping the network into a tree. In this tree (called a dendrogram in the social sciences, or a hierarchical tree in biology), the leaves are the vertices whereas the edges join vertices or communities (groups of vertices), thus identifying a hierarchical structure of communities nested within each other.

Partitioning graphs into communities and searching for subgraphs with high internal density within graphs/networks is of practical use in various fields: parallel computing, the Internet, biology, social systems, traffic management, etc.

For example, the following is an application in biology: Complex cellular processes are modular, that is they are accomplished by the concerted action of functional modules. These modules are made up of groups of genes or proteins involved in common elementary biological functions. One important and largely unsolved goal of functional genomics is the identification of functional modules from genomewide information, such as transcription profiles or protein interactions. To cope with the ever-increasing volume and complexity of protein interaction data, new automated approaches for pattern discovery in these densely connected interaction networks are required. Cluster analysis is an obvious choice of methodology for the extraction of functional modules from protein interaction networks. (See Detection of Functional Modules From Protein Interaction Networks, by Pereira-Leal, etc., Proteins, 2004; 54:49-57.)

A second example comes from the study of social networks: It is widely assumed that most social networks show "community structure", i.e., groups of vertices that have a high density of edges within them, with a lower density of edges between groups. It is a matter of common experience that people divide into groups along lines of interest, occupation, age, etc. (See *The structure and function of complex networks*, By Newman, *SIAM Review* 45, 2003; 167-256)

Due to the fact of its importance in applications, many clustering methods/algorithms have been discovered and patented (such as U.S. Pat. No. 5,040,133 Feintuch, et al., U.S. Pat. No. 5,263,120 Bickel, U.S. Pat. No. 5,555,196 Asano, U.S. Pat. No. 5,703,959 Asano, et al., U.S. Pat. No. 5,745,749 Onodera, U.S. Pat. No. 5,832,182 Zhang, et al., U.S. Pat. No. 5,864,845 Voorhees, et al., U.S. Pat. No. 5,940,832 Hamada, et al., U.S. Pat. No. 6,003,029 Agrawal, et al., U.S. Pat. No. 6,038,557 Silverstein, U.S. Pat. No. 6,049,797 Guha, et al., U.S. Pat. No. 6,092,072 Guha, et al, U.S. Pat. No. 6,134,541 Castelli, et al., U.S. Pat. No. 6,195,659 Hyatt, U.S. Pat. No. 6,269,376 Dhillon, et al., U.S. Pat. No. 6,353,832 Acharya, et al., U.S. Pat. No. 6,381,605 Kothuri, et al, U.S. Pat. No. 6,397,166 Leung, et al., U.S. Pat. No. 6,466,946 Mishra, et al., U.S. Pat. No. 6,487,546 Witkowski, U.S. Pat. No. 6,505,205 Kothuri, et al, U.S. Pat. No. 6,584,456 Dom, et al., U.S. Pat. No. 6,640,227 Andreev, U.S. Pat. No. 6,643,629 Ramaswamy, et al., U.S. Pat. No. 6,684,177 Mishra, et al., U.S. Pat. No. 6,728,715 Astley, et al., U.S. Pat. No. 6,751,621 Calistri-Yeh, et al., U.S. Pat. No. 6,829,561 Keller, et al., etc.), and some algorithms have been embedded in various popular software (such as, BMDP, SAS, SPSS-X, CLUSTAN, MICRO-CLUSTER, ALLOC, IMSL, NT-, NTSYS-pc, etc.).

In general, almost all existing clustering methods can be classified as one of two types: agglomerative or divisive, depending on how the hierarchical trees are constructed and how vertices are grouped together into communities. (Examples of agglomerative clustering algorithm are found in U.S. Pat. No. 5,040,133 Feintuch, et al., U.S. Pat. No. 5,832, 182 Zhang, et al., U.S. Pat. No. 6,049,797 Guha, et al., U.S. Pat. No. 6,092,072 Guha, et al, U.S. Pat. No. 6,134,541 Castelli, et al., U.S. Pat. No. 6,195,659 Hyatt, U.S. Pat. No. 6,397,166 Leung, et al., etc. Examples of divisive clustering algorithm are found in U.S. Pat. No. 6,038,557 Silverstein, U.S. Pat. No. 6,353,832 Acharya, et al., U.S. Pat. No. 6,381, 605 Kothuri, et al, U.S. Pat. No. 6,466,946 Mishra, et al., U.S. Pat. No. 6,505,205 Kothuri, et al, U.S. Pat. No. 6,640,227 Andreev, U.S. Pat. No. 6,684,177 Mishra, et al.; etc.)

SUMMARY OF THE INVENTION

The present invention provides a computer based method and a system for working with and analyzing data sets and, more specifically, for clustering a data set into subsets of closely related objects. The "objects" may be physical objects, such as people, genes or proteins, or portions of physical objects, or may represent less tangible data. A "level of relatedness" between objects of interest may represent any type of relationship between the "objects", such as how closely related they are or how similar they are. Alternatively, the level of relatedness may represent how dissimilar objects are, depending on the application.

The present invention is a computer based method, or may take the form of a general or special purpose computing system that implements the method. The invention may also take the form of a computer readable medium having computer-executable instructions embodied therein for performing the computer based method. Data to be processed by the method or system may be entered by a user, provided as an output from another device or system, or may be stored on a computer readable medium or computing device.

Some embodiments of the computer based method make use of a practical (polynomial) algorithm to detect all subgraphs whose dynamic density is k (for a given integer k). The algorithm, uses a well-defined measure of density and achieves its goal optimally; that is, it finds exactly the optimal solution, not just an approximation.

According to a first embodiment of the present invention, a computer-based method of clustering related data is provided. The data represents a plurality of objects of interest and information about levels of relatedness between pairs of the objects. The computer based method comprises:

establishing on a computer a weighted graph G having a plurality of vertices and a plurality of weighted edges each joining a pair of the vertices, each vertex representing an object of interest and each edge e having an integer weight w(e) representing a level of relatedness between the corresponding objects of interest and representing a set of w(e) parallel edges e joining the pair of vertices;

finding, on the computer, for a given integer k, all possible subgraphs H of G satisfying the following dynamic "edge-to-vertex" ratio:

$$\min_{\forall P} \frac{|E(H/P)|}{|P|-1} > k$$

where the minimum is taken over all possible partitions P of the vertex set of H, and E(H/P) is the set of edges crossing between parts of P;

identifying each subgraph H found as a level-k community if it is maximal, wherein a subgraph H is defined as maximal if there are no larger subgraphs containing it that satisfy the dynamic "edge-to-vertex" ratio for the same k; and outputting from the computer all level-k communities.

In some versions, the level of relatedness between objects of interest represents a similarity or closeness between the objects of interest.

In the computer based method, finding all possible subgraphs H of G may be accomplished by finding the maximal subgraph H that, for every edge e, H–e contains k edge-disjoint spanning trees.

Preferably, G is treated as the only level-0 community and finding all possible subgraphs H of G is accomplished by finding all level-k communities within a previously found level-(k−1) community, and repeating this finding step for k←k+1 until only single vertices remain. Finding all level-k communities within a level-(k−1) community H may be accomplished by:

a) letting $T_1, T_2, \ldots, T_{k-1}$ be edge-disjoint spanning trees of H;

b) finding a spanning forest $T_k$ in $$H - \bigcup_{i=1}^{k-1} E(T_i);$$

c) finding an edge e that is not used up in the set of $T_i$ for all i=1, ..., k, the edge being a seed edge;

d) establishing an edge subset $B_p$, starting with p=1, which initially contains the seed edge e;

e) expanding the subset $B_p$, recursively, for each $T_i$ and each e'∈$B_p$, by adding all edges e* of any circuit in $T_i$+e';

f) repeating step (e) until either;

(Case 1) $B_p$ connects two unconnected portions of $T_k$; or (Case 2) $B_p$ does not connect two unconnected portions of $T_k$ and, for every $T_i$ and every e'∈$B_p$, the circuit in $T_i$+e' contains no edge joining the same vertices as any edge in $B_p$;

g) if Case 1 of step (f) occurs, adjusting the set of spanning forests $\{T_1, T_2, \ldots, T_k\}$ and expanding the spanning forest $T_k$ and, thereafter, repeating step (c) for the adjusted set of forests $\{T_1, T_2, \ldots, T_k\}$;

h) if Case 2 of step (f) occurs, storing the subset $B_p$ and setting p←p+1 and repeating step (c) with an edge e that also does not join the same vertices as any edge in any of $B_1, B_2, \ldots B_{p-1}$;

i) merging $B_p$S that overlap; and j) outputting the set of subgraphs induced by stored subsets $B_p$ resulting from step (i), each of which is a level-k community of G and contained in H.

Expanding the forest $T_k$ as required in step (g) may be accomplished by recording a track of replacement for every edge of $B_p$, and then adjusting the set of forests $\{T_1, T_2, \ldots, T_k\}$ by adding the seed edge, thereby expanding the spanning forest $T_k$ by connecting unconnected portions of $T_k$. Recording the track of replacement for every edge of $B_p$ may be accomplished by recording the track of replacement for the seed edge e by initializing sequences I(e)=∅ and S(e)={e}, and recording the track of replacement for each edge e* in the circuit of $T_i$+e' by sequences I(e*)=I(e')i and S(e*)=S(e')e'.

Expanding the forest $T_k$ as required in step (g) may include letting e' be the edge of $B_p$ joining two unconnected portions of $T_k$ and letting I(e')=$i_1 i_2 \ldots i_{h-1}$ and S(e')=$e_1 e_2 \ldots e_h$ where $e_h$=the seed edge, and setting $T_k \leftarrow T_k + e'$ and for each r=1, ..., h−1, setting $T_{i_r} \leftarrow T_{i_r} + e_r - e_{r+1}$.

According to another embodiment of the present invention, a system is provided for determining a level of relatedness of data within a dataset. The system includes a computer processor, a memory in communication with the processor, an output device in communication with the processor, and a computer readable medium having computer-executable instructions embodied therein. The computer executable instructions perform a method comprising:

establishing a weighted graph G having a plurality of vertices and a plurality of weighted edges each joining a pair of the vertices, each vertex representing an object of interest and each edge having an integer weight w(e) representing a level of relatedness between the corresponding objects and representing a set of w(e) parallel edges e joining the pair of vertices;

finding, for a given integer k, all possible subgraphs H of G satisfying the following dynamic "edge-to-vertex" ratio:

$$\min_{\forall P} \frac{|E(H/P)|}{|P|-1} > k$$

where the minimum is taken over all possible partitions P of the vertex set of H, and E(H/P) is the set of edges crossing between parts of P;

identifying each subgraph H found as a level-k community if it is maximal, wherein a subgraph H is defined as maximal if there are no larger subgraphs containing it that satisfy the dynamic "edge-to-vertex" ratio for the same k; and outputting, on the output device, all level-k communities.

The processor is operable to execute the computer-executable instructions embodied on the computer readable medium.

In yet another embodiment of the present invention, a computer readable medium is provided, having computer-executable instructions embodied therein for performing a method of clustering related data representing a plurality of objects of interest and information about levels of relatedness between pairs of the objects. The method comprises:

establishing on a computer a weighted graph G having a plurality of vertices and a plurality of weighted edges each joining a pair of the vertices, each vertex representing an object of interest and each edge having an integer weight w(e) representing a level of relatedness between the corresponding objects of interest and representing a set of w(e) parallel edges e joining the pair of vertices;

finding, on the computer, for a given integer k, all possible subgraphs H of G satisfying the following dynamic "edge-to-vertex" ratio:

$$\min_{\forall P} \frac{|E(H/P)|}{|P|-1} > k$$

where the minimum is taken over all possible partitions P of the vertex set of H, and E(H/P) is the set of edges crossing between parts of P;

identifying each subgraph H found as a level-k community if it is maximal, wherein a subgraph H is defined as maximal if there are no larger subgraphs containing it that satisfy the dynamic "edge-to-vertex" ratio for the same k; and outputting from the computer all level-k communities.

The above described embodiments can be further revised to achieve an improved complexity, as will be clear to those of skill in the art, based on a review of the following. Other embodiments and variations on the present invention will also be clear to those of skill in the art based on a review of the following specification and Figures.

BRIEF DESCRIPTION OF THE DRAWINGS

FIG. 17 is a visual representation of the first tree $T_1$ with a different edge added thereto;

FIG. 18 is a visual representation of a circuit $C_1$ formed by addition of this edge;

FIG. 19 is a visual representation of tree $T_1$ with yet a different edge added thereto;

FIG. 20 is a visual representation of a circuit $C_1$ created by addition of this edge;

FIG. 21 is a visual representation of the updated edge set, $E_0$;

FIG. 22 is a visual representation of the tree $T_1$ with yet a different edge added thereto;

FIG. 23 is a visual representation of a circuit $C_1$ created by addition of this edge;

FIG. 24 is a visual representation of the updated edge set, $E_0$;

FIG. 33 is a visual representation of Graph H;

FIG. 34 is a visual representation of three trees, $T_1$, $T_2$ and $T_3$;

FIG. 35 is a visual representation of the updated edge set, $E_0$;

FIG. 36 is a visual representation of the tree $T_1$ or $T_2$ with an edge added thereto;

FIG. 37 is a visual representation of the tree $T_3$ with an edge added thereto;

FIG. 38 is a visual representation of circuit resulting therefrom;

FIG. 39 is a visual representation of adjustments to trees $T_1$ and $T_3$;

FIG. 40 is a visual representation of the adjusted trees;

DETAILED DESCRIPTION OF THE PREFERRED EMBODIMENTS

General Overview

Figure 1:
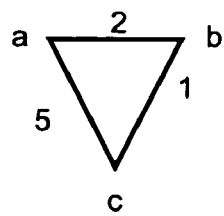
FIG. 1 is a visual representation of a simple dataset including vertices and connections between the vertices, with each of the connections having a weight associated therewith.

Some embodiments of the present invention provide improved methods, systems and algorithms for data clustering. These embodiments use mathematical graph theory techniques to provide a practical method of clustering a large dataset into subsets of the most closely connected objects. That is, when a dataset is made up of a network of input objects (such as the inhabitants of a town) that have associated levels of connection between them (such as the number of interactions between two inhabitants), the algorithm clusters these objects into subsets such that those subsets are interconnected to a proscribed degree and are as inclusive as possible. Embodiments of the present invention accomplish this by considering the objects as vertices in a weighted graph (in the graph theory sense) and the level of connectivity between a pair of objects as the number of edges connecting those vertices (also called the weight of the edge). Specifically, it considers the problem in terms of building trees spanning the graph (connecting every point with no unnecessary edges) and then, by means of unsaturated/used edges (that is, edges whose multiplicity/weight is greater than the number of times it appears in the set of trees), building the clusters by collecting well-connected edges (and, by extension, building a cluster of their associated vertices/objects) in a way that is computationally practical and also produces the unique cluster sets of a given connectedness. This is done such that the result is independent of any ordering imposed on the data in the input process.

More specifically, embodiments of the present invention rely on the concept of dynamic density to define connectedness within a data subset (that is, the associated subgraph). Though dynamic density is based on a definition that considers all possible ways to further partition the subset in question, embodiments of the present invention are able to build both the trees and the cluster sets iteratively with a guaranteed minimum dynamic density in an efficient manner. These embodiments do this by building and maintaining a set of edge-disjoint trees in such a way that the number of such trees spanning a subset while leaving at least one unsaturated edge can be used as a measure of the connectivity (that is, it is equivalent to the dynamic density). The unsaturated edges, that is those edges not being used by any spanning tree, are then utilized both to build the next tree within a currently considered set (if possible) and as starting points for finding internal data clusters of a higher level of connectivity than at the previous iteration of the process.

The process of the present invention is able to manipulate trees efficiently because it has a "fixed reference frame". That is to say, even as the algorithm searches through edges for ones to include in the potential cluster under construction, adjusting the trees as it goes, the set of new edges to be considered for inclusion is not affected by these necessary adjustments of the trees that are central to the process.

Simple Example to Illustrate the General Concept

Figure 2:
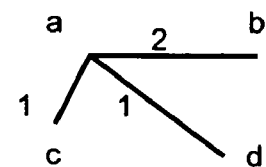
FIG. 2 is a visual representation of another dataset.

To explain the main features of the method in less complex mathematical language, one might say the method of this invention is a method for partitioning a dataset made up of a set of items and a set of quantified relations between those items, each relation being a positive integer (1, 2, 3, . . . ). A small example would be the items {a,b,c} and relations {ab} weight 2, {ac} weight 5, {bc} weight 1. FIG. 1 shows a representation of this data network, with the items as vertices, the connections as lines connecting them, and the weights of the connection written next to the associated edge; this is a representation of a weighted graph (a mathematical abstraction made up of vertices, edges between some pairs of those vertices and positive integers associated with those edges, the "weights" of the edges). These weights can be thought of as indicating multiple edges connecting the pair of vertices in question; looking at the example in FIG. 1, there are a weight 5 edge connecting {a} and {c}, a weight 2 edge connecting {b} and {c} and weight 1 edge connecting {b} and {c}. Note that it is not necessary for every item to have a positive relation to every other item. In FIG. 2 is shown a representation of objects {a,b,c,d} with relations {ab} weight 2, and {ac} and {ad} both weight 1. The missing edges may be thought of as edges with a weight zero. For example, the edge {cd} has a weight of zero, and therefore is not shown.

Figure 3:
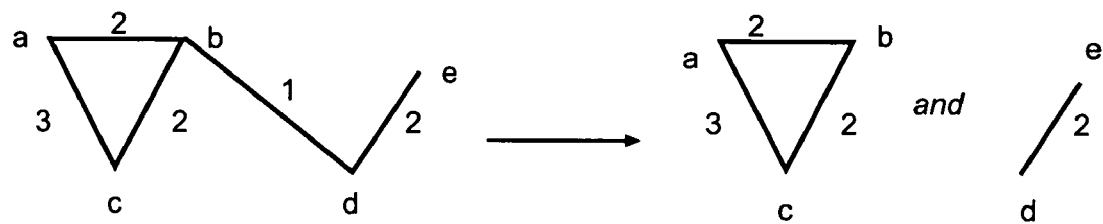
FIG. 3 is a visual representation of a starting graph and a pair of cluster communities into which the graph or dataset has been partitioned.

To see what partitioning by the number of connections looks like, a slightly more complicated graph is useful. FIG. 3 shows a starting graph with items {a,b,c,d,e} and relations or connections {ab} weight 2, {ac} weight 3, {bc} weight 2, {bd} weight 1, and {de} weight 2. FIG. 3 also shows this graph partitioned into two more closely connected clusters or communities. The first community includes items {a,b,c} and relations or connections {ab} weight 2, {ac} weight 3, and {bc} weight 2. The second community includes items {d,e} and relations {bd} weight 1, and {de} weight 2. In this example, to partition as indicated makes intuitive sense: {a, b, c} makes one subset of closely connected points and {d, e} makes another. As will be shown below, the present invention does indeed partition this very simple data set in this manner. However, a complication that can be seen even in this very simple example is that {a} is connected to {c} both directly, by a triple edge, and indirectly, by a double path using two double edges connecting through {b}. To deal with this complication, a more sophisticated definition of the connectedness, "dynamic density", is employed in this invention. The formal mathematical definition will be presented at a further stage of this patent description.

Figure 4:
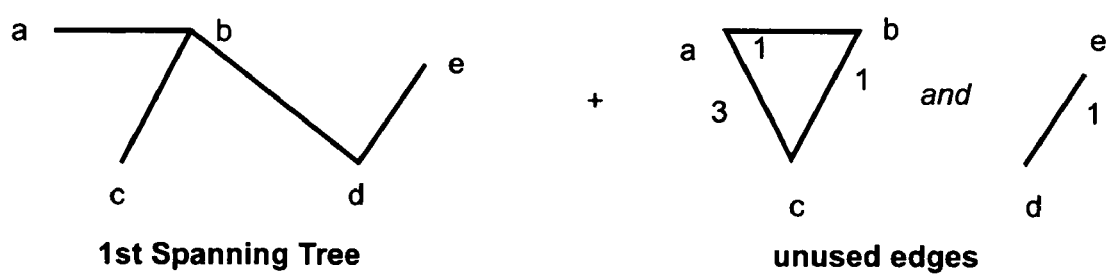
FIG. 4 is a visual representation of a spanning tree for the dataset of FIG. 3, along with a visual representation of the set of unused unsaturated edges associated with the dataset.

As stated previously, this invention makes use of a list of spanning trees to calculate the connectedness of a graph. A spanning tree is a subgraph (a graph that is a subset of the main graph's edges and vertices) that connects all vertices of the graph to be spanned using a minimum number of edges, that is one less than the number of vertices. An alternative definition of a spanning tree is a subgraph that connects all the vertices of a graph but contains no circuit (a circuit can be thought of as two paths between the same pair of vertices). FIG. 4 shows a spanning tree (all edges for a tree are always of weight 1) for the dataset depicted in FIG. 3 and the unused unsaturated edges which are critical for this invention.

The spanning tree on the left is not unique. Instead of the edge {ab}, {ac} could have been used to connect {a} to the rest of the vertices. Thus a particular spanning tree or set of spanning trees might turn out to be suboptimal. For this reason, the present invention adjusts trees in the course of the algorithm. It does this, however, in such a way as to not increase the computational complexity to the point of making the calculation unfeasible; in particular, it does not search through all possible sets of spanning trees, but yet it produces an optimal solution independent of what method is used to make the trees (in fact, the algorithm can build a tree "from scratch", but there are a number of standard algorithms that can be used to efficiently start the process).

The example of FIGS. 3 and 4 will be explored in extensive detail below, and as will clear from a complete review of this disclosure, the present invention may process a graph as shown on the left side of FIG. 3 to provide a series of communities. A level-0 (zero) community may be thought of as the starting dataset. However, it is assumed that the level-0 community has all of its vertices connected, which is to say that all vertices can be connected by a maximal spanning forest (that is, a tree). If an input graph includes 2 or more unconnected subgraphs, each subgraph is preferably treated as a level-0 community and processed independently. A level-1 community is a group of vertices or objects that are each interconnected or related one level more strongly than the vertices or objects of the level-0 community. A level-2 community is a group that is one level more strongly interconnected or related than a level-1 community, and so on.

Figures 5, 6A:
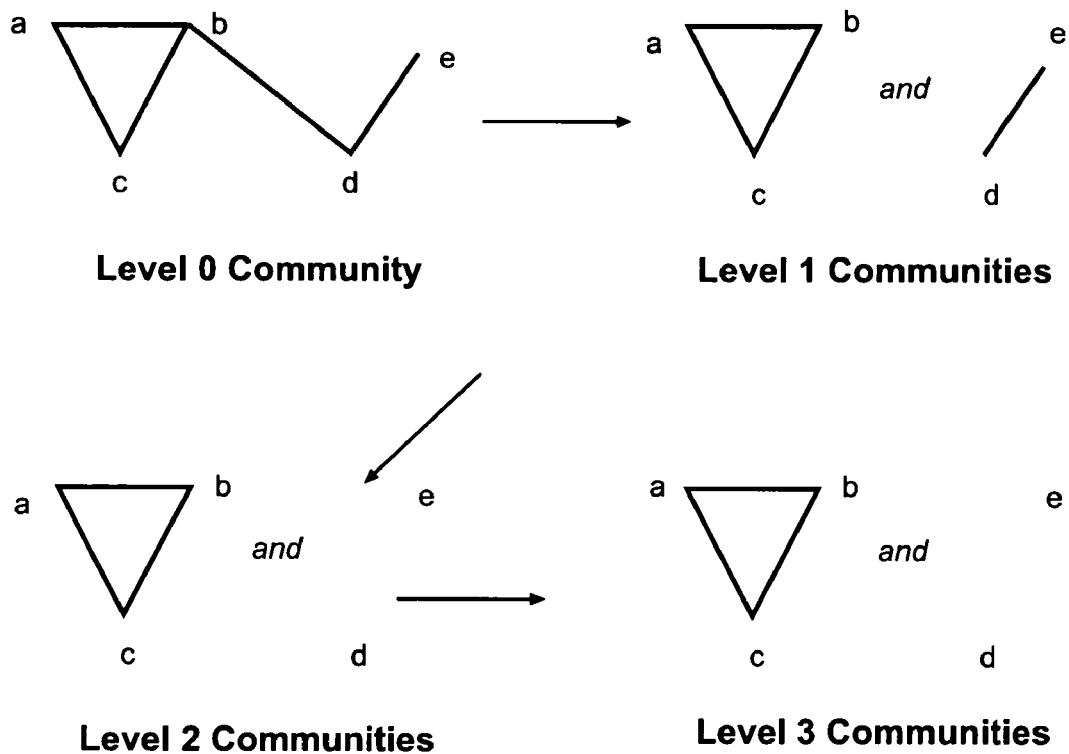
FIG. 5 is a visual representation of the level-0 through level-3 communities resulting from application of the present invention to the dataset of FIG. 3.
FIG. 6A is a tabular representation of the results shown in FIG. 5.
Figure 6B:
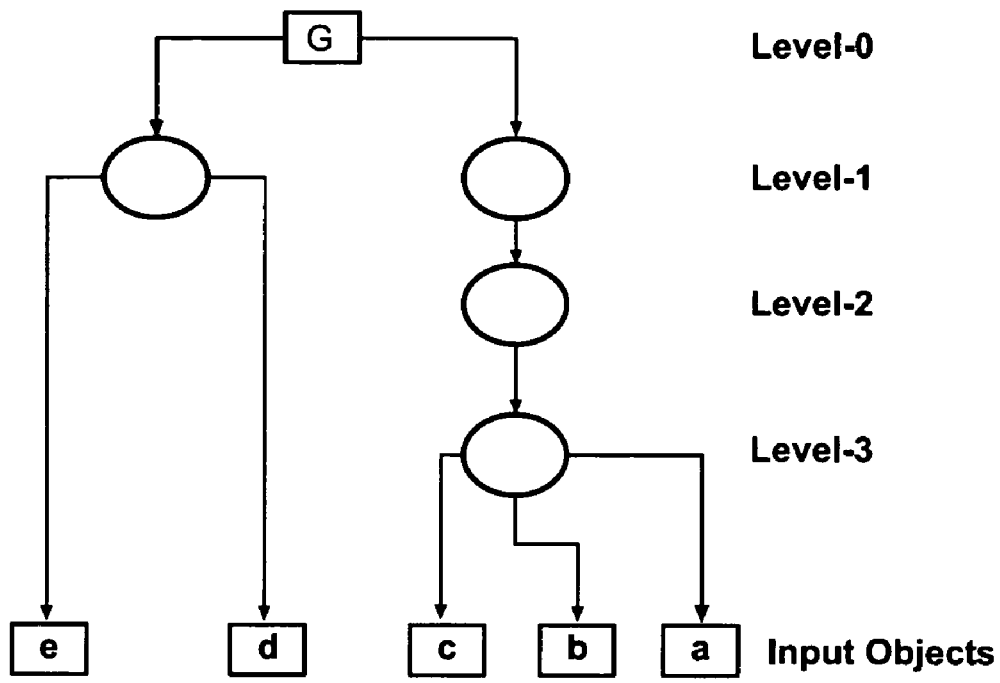
FIG. 6B is a hierarchical tree representing the example of FIGS. 3-6.

For the example of FIGS. 3 and 4, the dataset may be processed to provide several levels of communities. FIG. 5 shows communities or clusters for levels 0 thru 3. The output may also be provided in tabular form, as shown in FIG. 6. The reason that each cluster takes the form shown will become more clear following a detailed explanation of the process below.

Explanation of Formal Mathematical Basis for Invention

We turn now to an explanation of the formal mathematical underpinning of the present invention. This will be followed with an algorithm that represents one embodiment of the present invention, described in formal mathematical terms. The same embodiment will then be explained in more detail, in something closer to plain English. An example using the starting dataset of FIG. 4 will then be provided, and the process according to this embodiment will be applied to this dataset. Then, an algorithm that represents an additional embodiment of the present invention will be provided.

As a prelude to the formal mathematical description, it is necessary to define both the symbols used and the mathematical underpinning so that a precise description can be made.

Weight Graphs

In this invention, an input of a collection of related data is presented as a graph model G with a vertex set V(G) and an edge set E(G). Each vertex v of the graph G represents an input object. Each edge e of the graph G is a connection between some pair of vertices of V(G). This edge e represents the closeness/similarity of the two objects in the input data associated with the vertices. For the case of a weighted graph, which is the sort frequently encountered in practical applications, each edge e has associated with it an integer weight w(e). This weight can be thought of as representing w(e) parallel edges connecting the pair of vertices in the graph G.

Dynamic Density

Let H be a subgraph of graph G. The dynamic density of H is the greatest integer k such that $$\min_{\forall P} \frac{|E(H/P)|}{|P|-1} > k,$$

where the minimum is taken over all possible partitions P of the vertex set of H, and E(H/P) is the set of crossing edges between parts of P.

To explain again for those not fully familiar with this mathematical notation, H, as a subgraph of G, is itself also a graph, which is a collection of vertices V(H) and edges E(H). The vertex set, V(H), can be partitioned as $P=(V_1, V_2, \ldots, V_t)$ (where each $V_i$ represents a subset of vertices) and the set of edges in E(H) connecting vertices of H in different $V_i$ (as opposed to those connecting two vertices in the same $V_i$) is written E(H/P). Said another way, H/P is a graph where each vertex corresponds to some set of vertices $V_i$ of V(H) and each edge corresponds to an edge of H that crosses between two such sets. The number of edges (counting an edge e with weight w(e) as w(e) edges) is |E(H/P)|. This is normalized to take into account the size of P by dividing the number of crossing edges by |P|-1, where |P| is the number of sets into which P divides V(H).

The dynamic density is a well-defined way to quantify how internally connected a subgraph H is. If k is very high, then all parts of H are closely connected: no matter how one subdivides H, those subdivisions are closely connected to each other. If dynamic density k is low, some parts of H are only loosely connected to each other.

A maximal connected subgraph H of G with dynamic density at least k is a level-k community. By maximal here, we mean as inclusive as possible both of vertices from V(G) (every vertex that can be included is included) and also of edges (the edges E(H) are exactly those edges in E(G) that connect vertices V(H)). So in terms of this definition, the goal of this invention is, for a given integer h and an input graph G, to find a partition $\{V_1, V_2, \ldots, V_t\}$ of V(G) such that each subgraph of G induced by $V_i$ is a level-h community. That is, every subgraph of G induced by $V_i$ is of dynamic density at least h, while every subgraph that contains some vertices from two distinct parts $V_i$ and $V_j$ is of dynamic density less than h.

The full output of the algorithm is a hierarchical tree with the entire input graph G as the root (the level-0 community) constructed so that each node N in the k-th level of the tree represents a level-k community of the input G with its children (in the (k+1)th-level of the tree) all the level-(k+1) communities contained in N. The goal as stated in the previous paragraph would represent the hth level of this hierarchical tree of graphs.

Background of the Mathematical Issues Associated with this Invention

The most critical issue for algorithm design is complexity.

The number of partitions of a set of order n is call the Bell number and is denoted by $B_n$ (see the book by P. J. Cameron (1994) "*Combinatorics: topics, techniques, algorithms*" p39, and the book by G. E. Andrews (1984) "*The Theory of Partitions*" p214). It can be shown that the Bell number B, satisfies the relation $$B_n > 2^{n-1}$$

by applying recursively that the number of partitions of a set of size n into exactly two non-empty subsets is $2^{n-1}-1$. The above estimation of the Bell number can also be proved by applying the following recursive formula $$B_n = \sum_{k=1}^{n} \binom{n-1}{k-1} B_{k-1}$$

(see the book by P. J. Cameron (1994) "*Combinatorics: topics, techniques, algorithms*" p 40) and that the sum of binomial coefficients is $2^{n-1}$ and each $B_{k-1} \geq 1$.

So one can conclude that the Bell number $B_n$ is at least an exponential function. That is, the complexity of the determination of the dynamic density of a graph would be unfeasible if it was determined by searching all possible partitions of the vertex set.

However, the algorithm presented herein is able to determine the dynamic density with a polynomial complexity (at most $O(h^2n^2)$ and $O(m^2)$, where $n=|V(G)|$, the number of vertices/data items, $m=|E(G)|$, the total weight of G, and h is the maximum dynamic density of the goal partition). That is, the algorithm is feasible and practical.

As was described earlier, this invention is based on a description using spanning trees which is equivalent to the one above in terms of dynamic density. It is this that allows a practical algorithm.

Mathematical Claim: A graph H is of dynamic density at least k if and only if, for every edge e of H, the subgraph H–e contains k edge-disjoint spanning trees.

The proof of this claim is presented below. First, it is appropriate to define again here a few important technical graph theory terms that will be needed here and in later items describing the algorithm.

Circuit: a minimal non-empty subgraph of G in which each pair of vertices is connected by means of two disjoint edge sets. (That is, a circuit is just what one would expect from the everyday use of the word.)

Forest: a graph which has no circuits.

Tree: a forest which is connected.

Spanning forest: a spanning forest T of graph H is a forest that is a subgraph of H and that contains all vertices of H (that is, $V(T)=V(H)$).

Spanning tree: a connected spanning forest.

Proof of claim: Assume that H is a graph satisfying the following inequality:

$$\min_{\forall P} \frac{|E(H/P)|}{|P|-1} > k.$$

Let e be an arbitrary edge of H. In the graph H–e, we have the following inequality for every partition P of V(H):

$$\min_{\forall P} \frac{|E((H-e)/P)|}{|P|-1} > k.$$

By a theorem in graph theory (Tutte and Nash-Williams, *J. London Math. Soc.* 1961), the graph H–e contains k edge-disjoint spanning trees. This completes one direction of the proof.

Next, we assume that, for every edge e of H, the graph H–e contains k edge-disjoint spanning trees $T_1, \ldots T_k$. If there is a partition P of V(H) such that $$\min_{\forall P} \frac{|E(H/P)|}{|P|-1} > k.$$

Choose e as a cross edge between two parts of P. By contracting each part of P to a single vertex, each $T_i/P$ becomes a connected, spanning subgraph of (H–e)/P, each of which contains at least $|P|-1$ edges (the number of cross edges in $T_1/P$). The sum of all those cross edges would contradict the above inequality; this completes the proof in the other direction.

Sample Algorithm Illustrating a First Embodiment of the Present Invention

Summary List of Main Variables Used in the Algorithm $B_p$: edges of potential level-k community. A subset of edges from E(G).

$c_T(e)$: coverage of edge e. This tracks the number of spanning forests in T containing edge e.

e, e', $e_1$: edges.

$E_0$: unsaturated edges. This is a set containing all edges e in E(H) for which $c_T(e)<w(e)$. These edges are starting points for building potential level-k communities $B_p$ of some level.

E(H): edges of the graph H. An edge is a connection between some pair of vertices v, u in V(H). Edges represent connections between the pair of data points associated with v and u. Each edge e in E(H) has a weight w(e).

$f(e)$: flag function of the edges E(H). $f(e)=1$ indicates that the edge e in E(H) has already been checked for addition to the last spanning forest, $T_k$, and for inclusion into a potential level-k community $B_p$; $f(e)=0$ indicates that the edge has not been checked. When $f(e)=1$ for all unsaturated edges, e in $E_0$, the search for new level-k potential communities of the current subgraph H is complete.

G: the input graph; made up of vertices V(G) and edges E(G) with weights w(e) for e in E(G).

h: maximum level of search. Search starts at k=0 and runs through the end of k=h step.

H: subgraph currently being partitioned in an iterative process. At k=1, H=G. I(e): a sequence of indices of forests in the track record. This accompanies the sequence of edges, S(e), and is used to adjust the forests in T by swapping edges between forests and $E_0$.

p: integer counting the current number of potential communities. Used by $B_p$.

S(e): a sequence of edges in the track record. This accompanies the sequence of indices of forests, I(e), and is used to adjust the forests in T by swapping edges between forests and $E_0$.

T: a set of spanning forests. The number of spanning forests in T (all spanning "trees" except possibly the last) is the same as the level of community under construction, k.

V(H): vertices of graph H. Represents a data object in some dataset.

w(e): weight of an edge e in E(G). Integer value representing the level of connectedness or relatedness between the two vertices joined by e. This relatedness can represent any type of relationship. As will be clear to those of skill in the art, a non-integer value for relatedness can be rounded to an integer value, all values can be multiplied by the least common multiple of the denominators or the values can be otherwise converted for use with the present invention. The weight w(e) can be thought of as the number of copies of e that can be used before e is "saturated", completely used.

Description

The input graph G may have parallel edges. For each edge e, the multiplicity of e is denoted by w(e) (the number of parallel edges between a pair of given vertices). For a set T of spanning forests (that is, a subgraph of G connecting its vertices which contains no circuits), the coverage of an edge e is the number of members of T containing the edge e, denoted by $c_T(e)$. (In the algorithm, it is required that $c_T(e) \leq w(e)$; that is, one can only use an edge w(e) times). The set of edges with $c_T(e) \leq w(e)$ (unsaturated edges) is denoted by $E_0$. These edges can be thought of as edges leftover from the edges of G after the construction of the set T of spanning forests.

The input graph G itself is considered as a level-0 community if $E(G) \neq \emptyset$ (where $\emptyset$ indicates an empty set). $E(G)=\emptyset$ represents the trivial case of no connections between vertices.

This example makes use of a "flag" to act as a "stop and restart" sign for the completion of the current community search and the starting point of searching another community. This flag is not "on" until the search of the current community ends. That is, the process of searching a new "community" is to start when the "flag" is "turned on". In the following sample algorithm, the "flag" is a function $f$ associated with each $e \in E(G)$ (where "$\in$" means "element of"). Initially all functions/flags $f(e)$ are set to 0. After an edge has been processed, its $f$-value is set to 1.

This example also makes use of a "Track record". A track record is a set of sequences (edge-sequence, index-sequence, or other sequences) associated with each edge (or vertex) of G. The purpose of a "track record" is to record the track of any possible adjustment and expansion of a set of spanning trees/forests. In this sample algorithm, the track record is a pair of sequences associated with each edge e: a sequence S(e) of edges and a sequence I(e) of indices of forests.

The integer p counts the number of potential communities. The subset $B_p$ collects edges of the current level-k-community.

Algorithm

Figure 7:
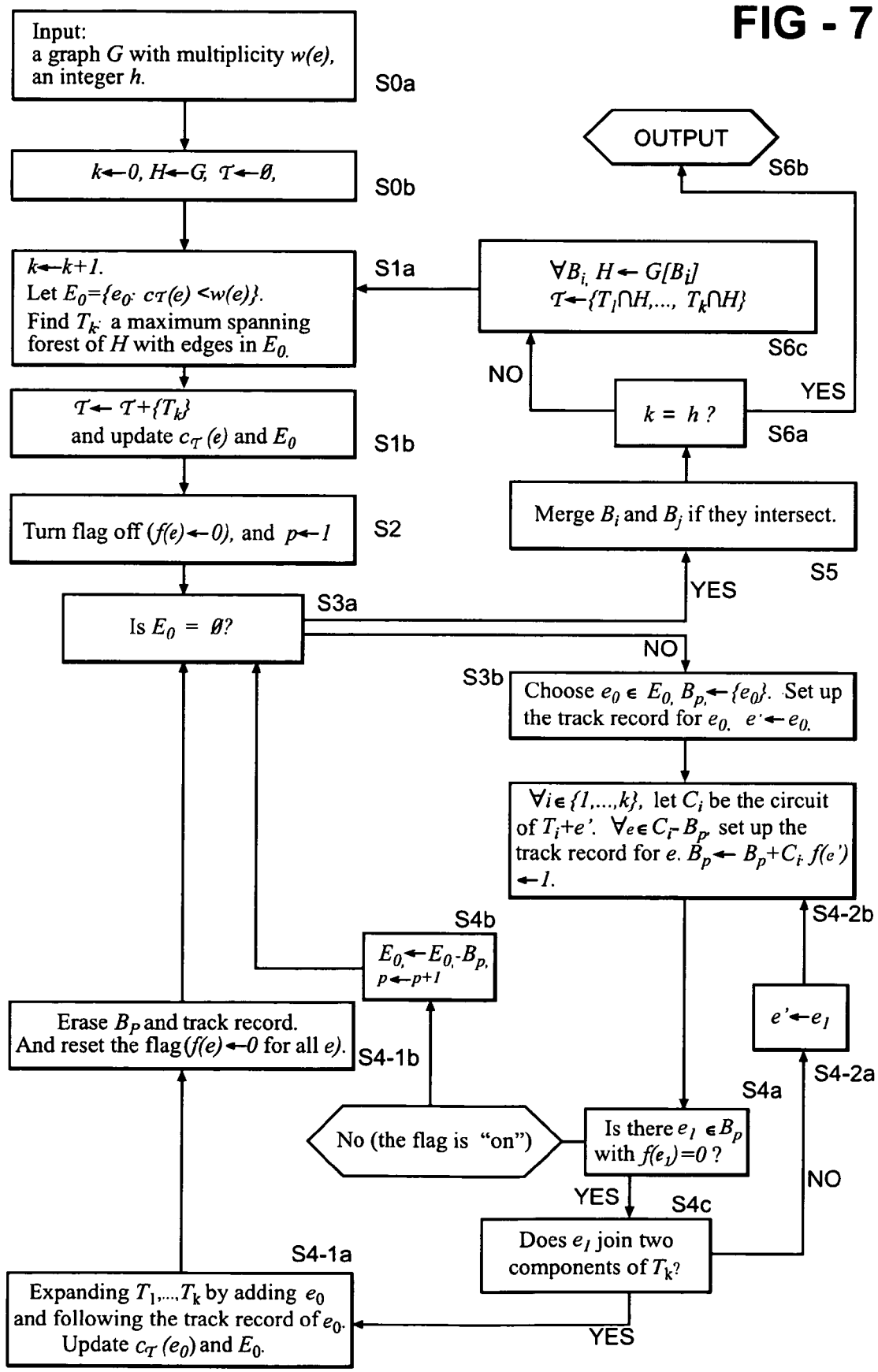
FIG. 7 is a flowchart illustrating the first embodiment of an algorithm according to the present invention.

A sample algorithm according to a first embodiment of the present invention is shown in flowchart form in FIG. 7, and will be described below.

Inputs: (see S0a in flowchart) a graph G with w(e) as the multiplicity for each edge e and an integer h.

Goal: find all level-h-communities in G.

Referring to S0b in the flowchart, the initial conditions are set. This step sets k=0 (the program runs until k=h level is complete), H←G (a level-0-community), T←Ø (the set of spanning trees in H) and $c_T(e)=0$ for all e in E(G).

Step 1 (see S1a in flowchart)

k←k+1.

(Note: if k>1, T={$T_1, \ldots, T_{k-1}$} is a set of edge-disjoint spanning trees of H, and $c_T(e)$ is the coverage of each edge. These are outputs of Step 6 in the previous iteration of the main algorithm. When k=1, no spanning tree preexists (i.e. this is the first iteration).

Let $E_0$ be the set of edges (unsaturated edges) e with $c_T(e) < w(e)$.

Let $T_k$ be a spanning forest in H consisting of edges of $E_0$. As known to those of skill in the art, there are a number of approaches to creating such a spanning forest, any of which may be used with the present invention. Preferably, we apply either Kruskal's algorithm, or, Prim's algorithm so that $T_k$ is maximum in the subgraph of H induced by edges of $E_0$. (See book "*Applied Combinatorics*" by Roberts and Tesman, p. 737-742).

(see S1b in flowchart)

Let T←T+{$T_k$} and update the coverage $c_T(e)$ and $E_0$ as follows:

$c_T(e) \leftarrow c_T(e)+1$ if e is an edge of $T_k$, otherwise, $c_T(e)=c_T(e)$ (no change), and delete all edges e in $E_0$ such that $c_T(e)=w(e)$.

Go to step 2.

Step 2 (see S2 in flowchart)

For each $e \in E(H)$, let $f(e) \leftarrow 0$. Let p←1 and go to Step 3.

Step 3 (see S3a in flowchart)

If $E_0 = \emptyset$, then go to Step 5.

Otherwise, (see S3b in flowchart) pick any $e_0 \in E_0$ and set the track record $S(e_0) \leftarrow \{e_0\}$; $I(e_0) \leftarrow \emptyset$.

Let $B_p \leftarrow \{e_0\}$, and let $e' \leftarrow e_0$.

Go to Substep 4-2 of Step 4 (one does not need to perform the checks in the first part of Step 4 because $e_0$ is in $E_0$ and $T_k$ was constructed to be maximal relative to $E_0$.)

Step 4 (see S4a in flowchart)

If $f(e)=1$ for every $e \in B_p$, (see S4b in flowchart) then $E_0 \leftarrow E_0 - B_p$, p←p+1 and go to Step 3.

Otherwise, (see S4c in flowchart) pick $e_1 \in B_p$ with $f(e_1)=0$. Does $e_1$ join two components of $T_k$? If yes, go to Substep 4-1; if no, let e'←$e_1$ and go to Substep 4-2.

Substep 4-1. (see S4-1 in flowchart) Adjust the forests as follows:

Suppose $S(e_1)=e_{i_1}, e_{i_2}, \ldots, e_{i_t}$;

$I(e_1)=\mu_1, \mu_2, \ldots, \mu_{t-1}$.

For $j=1, \ldots, t-1$, let $T_{\mu_j} \leftarrow T_{\mu_j} + e_{i_j} - e_{i_{j+1}}$ and let $T_k \leftarrow T_k + e_1$.

Also update the coverage $c_T(e)$ as follows: $c_T(e) \leftarrow c_T(e)+1$ if $e=e_0$, otherwise, $c_T(e)=c_T(e)$ (also delete $e_1$ from $E_0$ if $c_T(e_1)=w(e_1)$).

(see S4-1b in flowchart) Let $f(e) \leftarrow 0$ for every e and $B_p \leftarrow \emptyset$.

After the adjustment, go to Step 3.

Substep 4-2. (see S4-2b in flowchart) For i=1, 2, ..., k, $T_i + e'$ contains a circuit $C_i$.

For each $e \in E(C_i) - B_p$, let $S(e) \leftarrow S(e')e$;

$I(e) \leftarrow I(e')i$.

Let $B_p \leftarrow B_p \cup E(C_i)$.

Let $f(e') \leftarrow 1$.

Go to (the beginning of) Step 4.

Step 5 (see S5 in flowchart)

For i, j=1, 2, ..., p with i≠j, if $V(B_i) \cap V(B_j) \neq \emptyset$ then merge $B_i$ and $B_j$.

Step 6 (see S6a in flowchart)

If k=h, (see S6b in flowchart) output all $B_i$, each of which is a level-h-community of G. If k<h, (see S6c in flowchart) then repeat Step 1 for H←G[V($B_i$)] for every i, and T={$T_1|H, T_2|H, \ldots T_k|H$}, the set of edge-disjoint spanning trees in H (as inputs of Step 1 for the next run of the algorithm at level (k+1)).

Further Description of Algorithm

The following is a well-known lemma in mathematics, which plays a key role in the search for possible expansions of the last spanning forest $T_k$ and the search for edges in the same community.

Let T be a spanning forest of a graph G and let e be an edge of E(G)−E(T) (an edge not contained in the forest T). Then, either T+e is a larger spanning forest, or T+e contains a unique circuit. Furthermore, if T+e contains a circuit C, then T+e−e' is again a spanning forest of G for every edge e' of the circuit C (in other words, e' is any edge in the circuit created by adding e to T).

Communities are detected level-by-level in G. The main part of the algorithm is repeated for each k=1,2, ..., h. For each k, the algorithm detects all level-k-communities in a previously identified level-(k−1)-community H. The following is an explanation of the main idea of the algorithm.

a. Let $T_1, T_2, \ldots, T_{k-1}$ be (k–1) edge-disjoint spanning trees of a level-(k–1) community H, and let $T_k$ be a spanning forest in $H-E(T_1)-E(T_2)-\ldots-E(T_{k-1})$.

b. Find an unused edge $e_0$ ($e_0$ is not in any forest $T_i$: i=1, ..., k). Label all edges of the unique circuit contained in $T_i+e_0$. Repeat this procedure for each i=1, ..., k. (Labeled edges are added into $B_p$—a potential level-k-community.)

c. Label all edges of the unique circuit contained in $T_i+e$ (added into $B_p$). For each edge e' of $B_p$, repeat this procedure again until one of the following two cases occur: (1) some new edge e' of $B_p$ joins two components of the last forest $T_k$; or (2) the "flag" is turned on. (In the sample algorithm, the "flag" is "on" when every edge in $B_p$ is of $f$-value 1.)

d. If Case (1) of (c) occurs, that is, an edge e' found in (b) or (c) joins two components of $T_k$. Then Substep 4-1 will be executed for adjustment: the forest $T_k$ is therefore expanded as follows: adding $e_0$ (the unused edge given in (b)) into some tree/forest and recursively replacing a sequence of edges into and out of a corresponding sequence of trees/forests (as described in Substep 4-1). That is, a new set of spanning trees/forest is to be constructed in $$\bigcup_{i=1}^{k} E(T_i) \cup \{e_0\} \left( \text{wherein } \bigcup_{i=1}^{k} E(T_i) \right)$$

means union of all these edges sets, that is the union of all $E(T_1), E(T_2), E(T_3), \ldots, E(T_k)$).

e. If Case (2) of (c) occurs, every edge of the circuit contained $T_i+e'$ is already contained in $B_p$ for every edge e' of $B_p$, and, every spanning tree/forest $T_i$. Therefore, the subgraph $B_p$ cannot be expanded further and is of dynamic density at least k. At this time, Substep 4-2 stops and the algorithm returns to Step 3 to search for another potential level-k-community $B_{p+1}$.

f. Combine overlapping subgraphs with dynamic density at least k.

Other Special Methods and Techniques in the Algorithm Design for the Reduction of Time-Complexity The sample algorithm described shows the most basic and fundamental ideas of this invention. Using the same or similar ideas, the algorithm can be further revised or improved for the purpose of the reduction of time complexity. Different methods or approaches include (but are not limited to):

a. Edges of $B_p$ found in Step 4 can be contracted as a single vertex in Step 4-2 before the processing of p←p+1 and the repeating of Step 3.

b. Vertices of the unique circuit in $T_i+e'$ can be labeled, instead of the edges, and all edges with both labeled end vertices can be used for further adjustment/expansion. This search is processed along spanning trees instead of all labeled edges.

Those different contraction methods are fulfilled by different methods of keeping "track records", setting "flags", or defining other parameters.

Important Roles of an Extra Edge—a Special Method and Technique in the Algorithm Design that Reduces the Time-complexity, and Improves the Connectivity of Outputs.

One preferred part of this invention is the connectivity measurement by the parking of spanning trees with an extra edge. An extra edge makes the search processing traceable, and therefore, practically feasible. Let $e_0$ be an edge not contained in any of the forests $T_i$, for every i=1, ... k. Let $R(e_0) \leftarrow \{e_0\}$ be the set of edges that are replaceable by $e_0$. Add all edges $e_y$ into $R(e_0)$ for which $e_y$ is contained in the circuit of $T_j+e_x$ for some $e_x \in R(e_0)$. Elements of $R(e_0)$ are edges replaceable by $e_0$. The subgraph of G induced by $R(e_0)$ is a subgraph with dynamic density k whenever the spanning forests have reached their maximum.

The existence of an extra edge in a community eliminates some less connected outputs.

Fixed Reference Frame—an Important Method and Technique in the Algorithm Design that Reduces the Time-complexity and Memory Storage Complexity.

All edges that are replaceable by an extra edge $e_0$ are determined by referring to the initial set of forests $\{T_1, \ldots, T_k\}$. The correctness of the expansion procedure for the last spanning forest $T_k$ and the searching procedure of all edges replaceable by $e_0$ can be mathematically proved. Therefore, it eliminates the complexity of recording and tracing all modified forests for every additional edge in $R(e_0)$.

The Classification of the Method—Neither Agglomerative Nor Divisive.

Almost all existing methods for clustering can be classified as two types: agglomerative and divisive, depends on the constructions of the hierarchical trees and the ways that vertices are grouped together into a community. However, the method presented in this patent is neither agglomerative nor divisive. Instead, the hierarchical tree is built from the top (the level-0 community—the input G itself) by dividing a level-(k–1)-community into several level-k-communities. And a k-community is detected by clustering vertices together based on their cyclic connection in a spanning tree of the level-(k–1)-community.

Special Features of the Method (About the Outputs)

Uniqueness of Outputs and Independence of Labeling

Output of a program according to embodiments of the present invention that searches communities with dynamic density as the measurement of density is independent of the labeling. That is, for two different labelings of the vertex set of the same input, the outputs of the program are the same. Note that most existing methods, either agglomerative or divisive, are not independent of labeling: computer programs follow the order of the labeling in each repeating or recursive computation and, therefore, vertices with smaller labels tend to have a higher priority of being selected. The outputs will be different if the input graph has some vertices with similar local structures which are close to each other. However, the output using the method of the algorithm of this patent is independent of the labeling and therefore the output of the same input is unique.

Density of Communities

For each level-k community H of G, the subgraph H is denser inside H than its connection with any other part outside of H. That is, the dynamic density of H is at least k, while any subgraph of G induced by some vertices of H and some vertices outside of H must be of dynamic density less than k.

Well-Defined Mathematically

The special features described in the previous two paragraphs are due to the fact that the measurement of density is mathematically well-defined, and the optimization goal is fully achieved by the program. Therefore, it is not an approximation approach.

Sample Algorithm in Plain Language

Figure 8A:
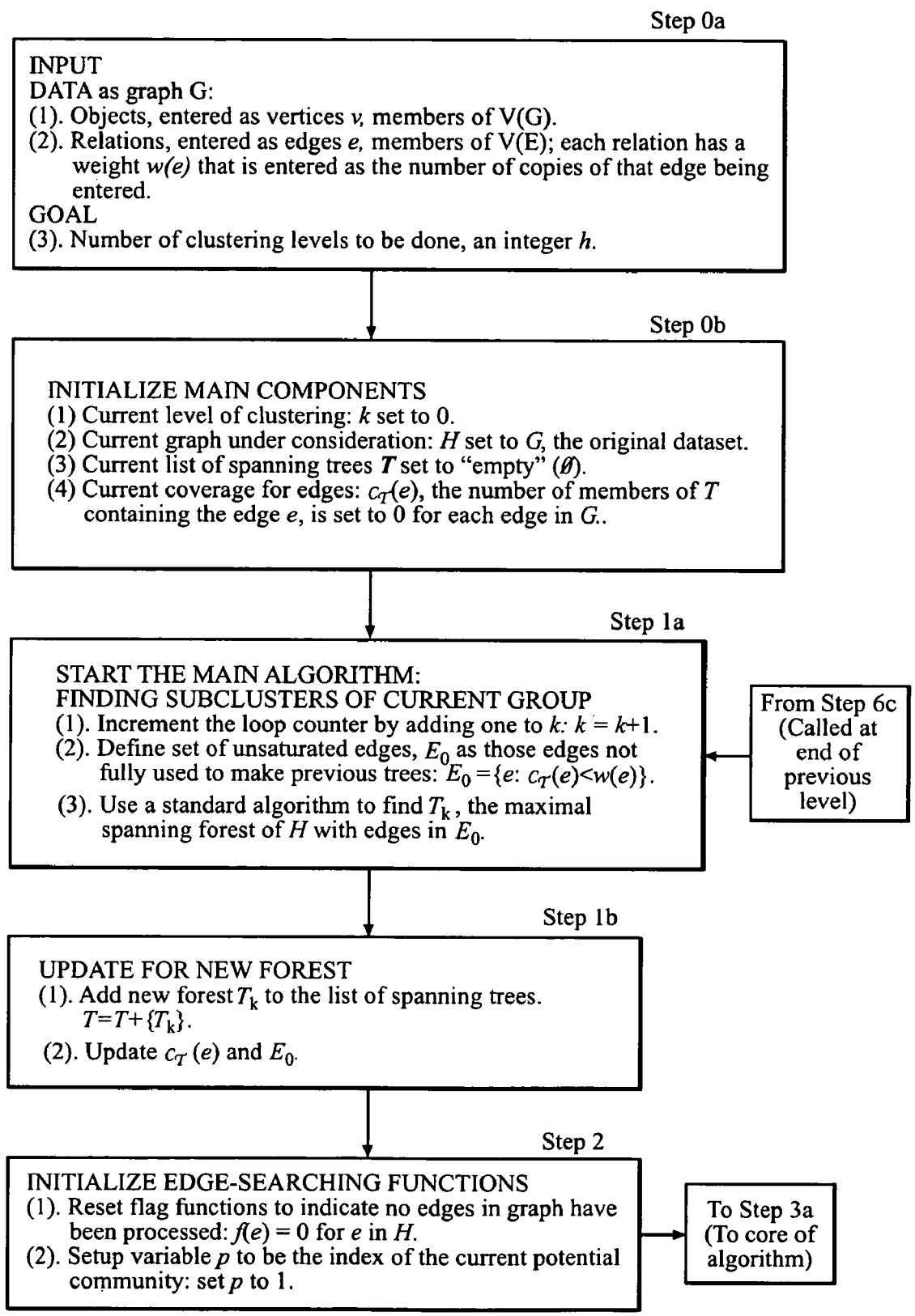
FIGS. 8A-8C are flowcharts representing the algorithm of FIG. 7 in "plain language"
Figure 8B:
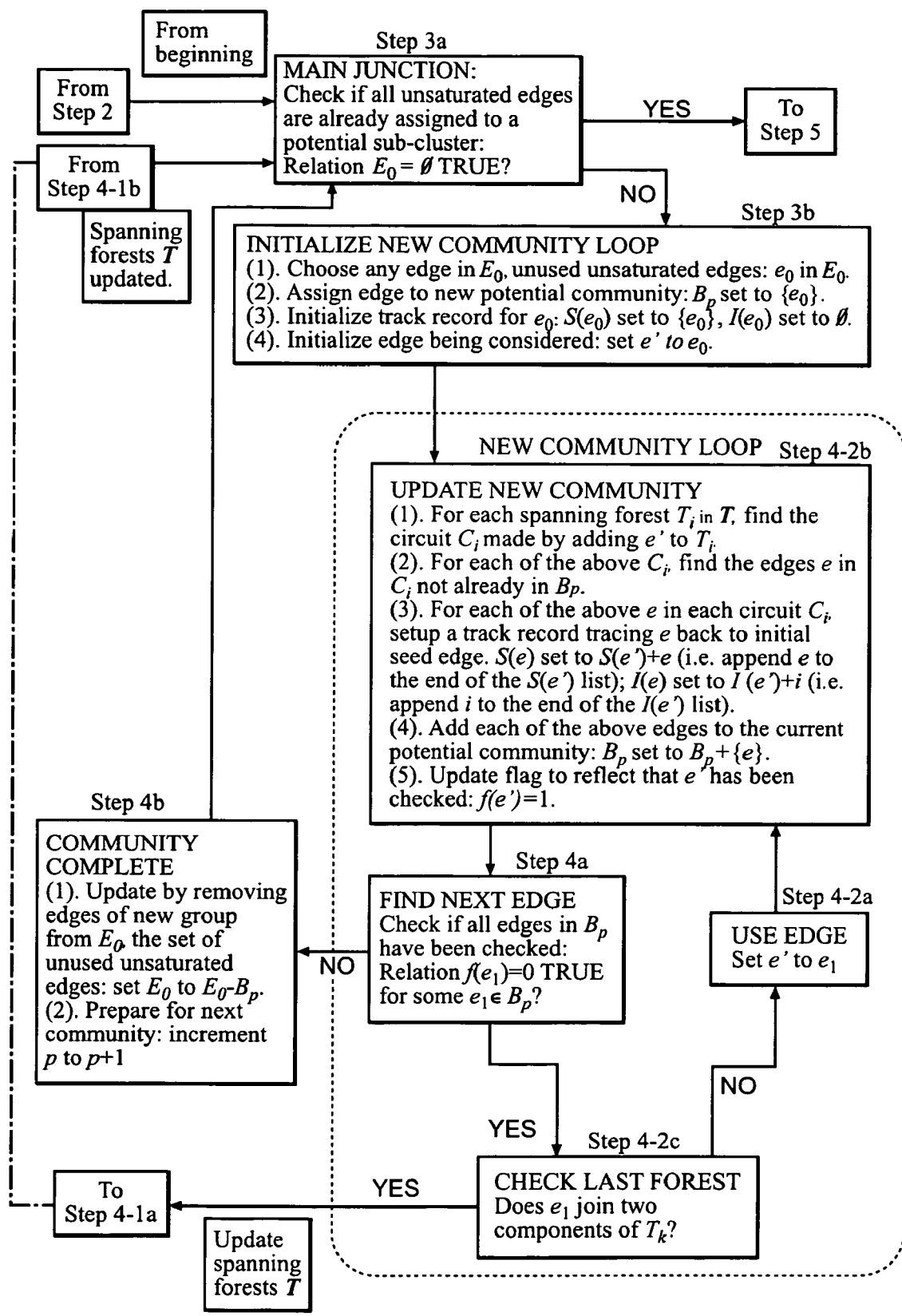
Figure 8C:
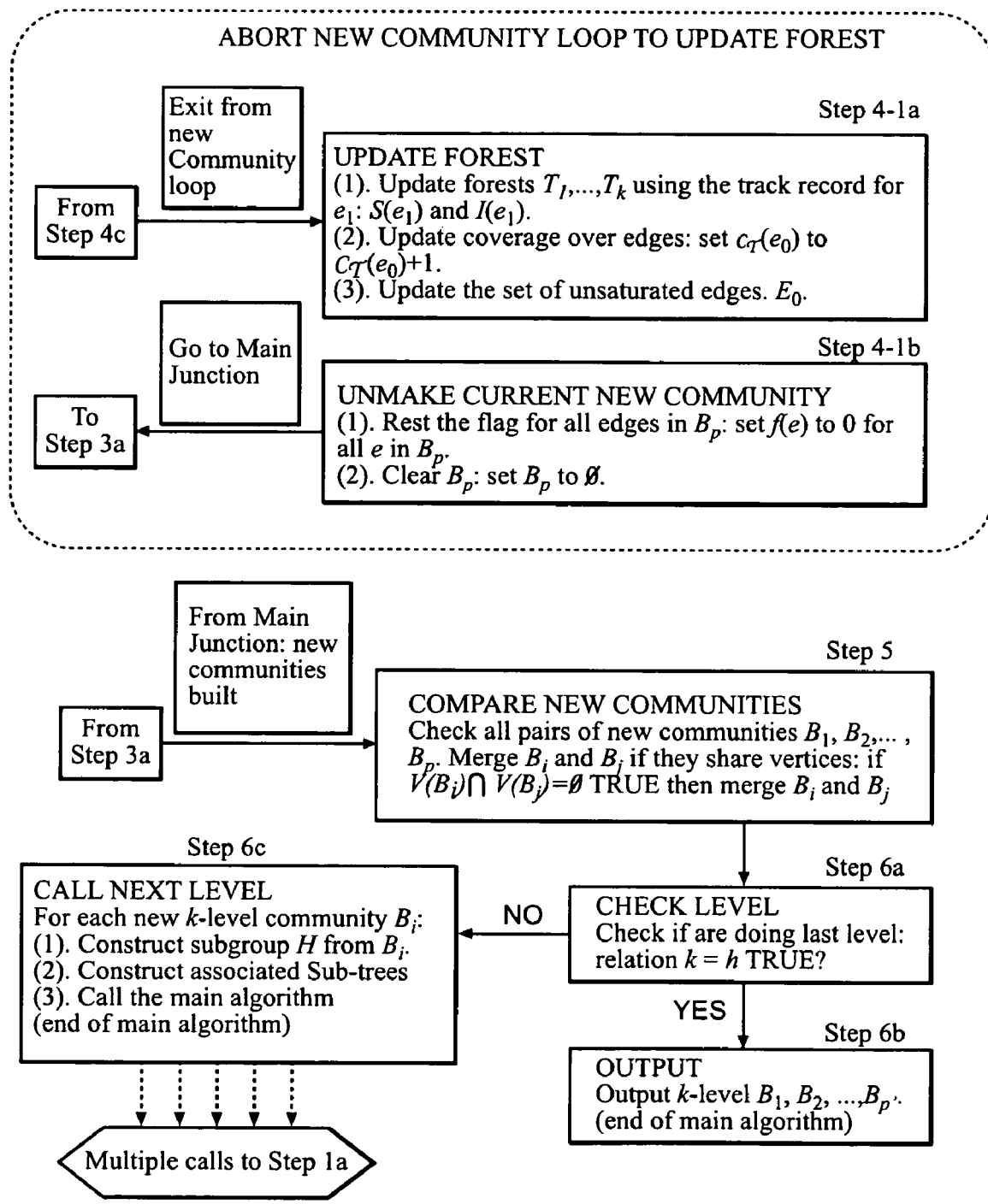

The above algorithm will now be described in more detail and in something closer to plain language. FIGS. 8A-8C provide a "plain language" flowchart for the sample algorithm, and will be described below. The steps described below correspond both to the flowchart of FIGS. 8A-8C and the flowchart of FIG. 7.

Step 0: Initial Setup

INPUT—Step 0a: initial step, always followed by Step 0b DATA

The data is entered in the form of a graph G. This graph is made up of two parts:

(1) Objects are entered as vertices v, referred to collectively as V(G). The goal of the algorithm is to find clusters of these objects/vertices. That is, the goal is to determine how to arrange these objects into subsets so that objects in the same subset have at least a certain level of relatedness as described in the theory section. Objects in different subsets are less related according to the relationship criterion of this algorithm, dynamic density. As far as the actual input of the objects, in computer terms one may assign an index to each item and keep track of them as a list, making sure to do this in such a way that the associated relation connecting them is maintained. An "objects" or "objects of interest" may be physical objects, such as people, genes or proteins, or portions of physical objects, or may represent less tangible data. A "level of relatedness" between objects of interest may represent any type of relationship between the "objects", such as how closely related they are or how similar they are. Alternatively, the level of relatedness may represent how dissimilar objects are, depending on the application.

(2). Relations are entered as edges e, referred to collectively as V(G). Theses relations indicate a "direct connectedness" between a pair of objects; the informal use of "direct connectedness" just previously is in contrast to other notions of connectedness that allow a hypothetical object A to be connected to C if they are both connected to an intermediary B. Each relation has a strength associated with it that is part of the dataset; this strength is referred to as a weight. If the relation is represented as edge e, the weight of the edge is represented in the algorithm as w(e); in terms of the graph G, this weight indicates many copies of the identical edge enters the graph G. In computer terms, one may make a second list with its own index; each member of the list contains information on which two objects it relates (a pair of indexes referring back to the list of vertices/objects) and an integer representing the weight, w(e). The relation, weight, number of connections, or "level of relatedness" between objects or vertices may represent any type of relationship between the "objects", such as how closely related they are or how similar they are. Alternatively, the level of relatedness may represent how dissimilar objects are, depending on the application.

Goal or Target level of search:

One also inputs how many levels of clustering are to be done, which will be referred to as h. One could in principle run the algorithm until it separated the dataset into sets containing one object each (after which, there could be no more refinements into smaller subsets), but since each level has a computational cost, often one wants to set a limit. Note that this algorithm calculates the intermediate levels of clustering, so that the output of a larger h includes all output that could be generated by a smaller h. The subsets in a clustering are called "communities". Ultimately the goal is to partition the vertices/objects, but it is just as accurate to refer to a graph H or just a set of edges B as a community. In the case of H, it is the set of vertices V(H) that correspond to the cluster of objects. In the case of B, it is the set of vertices making up the edges in B that correspond to the cluster of objects. The goal of the algorithm can be stated as "Find all level-h communities in G."

The data used in the present invention may be referred to as a database, a data set, or in other ways, and may be provided to the system or method in any way known to those of skill in the art. This may be referred to herein as "establishing" the weighted graph. The graph may be established by loading data from a database or data set, reading data from a storage device or computer readable medium, receiving data from another system or process, receiving data through any type of input device, or in any other way.

INITIALIZE MAIN COMPONENTS—Step 0b: called once at the end of Step 0a and always followed by Step 1a.

(1) Current level of clustering, k, is set to 0 to indicate that the main algorithm has run zero times so far.

(2) The main algorithm is called once for each community produced at the previous level. In this sample it will be assumed that the first graph, G, is a single connected graph, and thus a level-0 community. Otherwise, for the case where G is made up of multiple unconnected pieces, this algorithm would be run on each such connected sub-graph of G separately. In such a case, each such initial connected sub-graphs is a level-0 community. For convenience, in this description of the algorithm, it is assumed that G is a single connected level-0 community. The first graph that needs to be processed by the algorithm is the whole starting graph so the algorithm sets the sub-graph under consideration, H, to be G, the graph corresponding to the original dataset.

(3) This algorithm depends on manipulation of trees and possibly one forest. (Recall, a tree is a connected forest.) Each level uses the previous level's forests to generate the first k−1 trees and then creates the kth forest using some standard algorithm to generate an initial forest from remaining edges. In this setup phase there are no trees or forests; therefore the list of spanning forests T is set to "empty" (T=∅).

(4) As the trees are built, it is important to keep track of how many forests currently make use of each edge. That is, how many total copies of each edge are used in the complete collection of spanning forests, T. Recall that w(e) counts the number of edges in the current graph H. The number of edges used by the forests, then, is limited to no more than w(e). The number of forests containing an edge e is designated $c_T(e)$; this integer array is referred to as "the current coverage for edge e". Array $c_T(e)$ is initially set to 0 for each member (each edge in G); no edges are in use by T, as there are no trees or forests initially.

START THE MAIN ALGORITHM—Step 1a: called the first time from Step 0b to start the process; thereafter called recursively by Step 6c for each level-(k−1) community found inside the previous subgraph H; always followed by Step 2b.

(1) Update the main algorithm level counter by incrementing k to k+1.

(2) Note: if k>1, in addition to H, the input to the main algorithm (if one considers the main algorithm as a sub-piece of the whole process) includes $T=\{T_1, \ldots, T_{k-1}\}$, a set of edge-disjoint spanning trees of H, and $c_T(e)$, the current coverage of each edge. ($\{T_1, \ldots, T_{k-1}\}$ "edge-disjoint" means if one considers the graph G as containing w(e) copies of the edge e, then when different $T_i$, $T_j$ both use e, these are different copies of e.

Define "unsaturated edges" for the current subgraph under consideration, H and starting trees $T=\{T_1, \ldots, T_{k-1}\}$. An edge is unsaturated if the number of trees containing it is less than the total number of that edge in the subgraph H being partitioned by the loop: e in H and $c_T(e)<w(e)$ implies e unsaturated. Define $E_0$ to be this set of unsaturated edges e in H. In computer terms, $E_0$ will be a list of edges. Note that unlike with H, only distinct edges are being considered, not multiple copies of the same edge; that is to say, no two edges in $E_0$ connect the same pair of vertices.

(3) Construct $T_k$, the kth spanning forest in H. This new forest, $T_k$, will be constructed only using edges in $E_0$. This can be done in a number of ways; this algorithm is not dependent on which is used. For example, one can apply either Kruskal's algorithm, or, Prim's algorithm so that $T_k$ is maximum in the sub-graph of H induced by edges of $E_0$. (See the book "*Applied Combinatorics*" by Roberts and Tesman, p. 737-742). In computer terms, we can think of this as a call to a separate algorithm. Note, that $T_k$ may not be a tree, that is, it may not have enough edges to be fully connected; the algorithm will improve on this if possible by making adjustments to all the forests in T.

UPDATE FOR NEW FOREST—Step 1b: called once per implementation of the main algorithm between Step 1a and Step 2.

(1) Add the new forest to the spanning trees already in T to make a set of k spanning forests for H. So $T=T+\{T_k\}$.

(2) Next update the current coverage of edge e, $c_T(e)$, and the set of unsaturated edges $E_0$ as follows: for each edge e in the new forest $T_k$, increment the coverage of that edge by one: $c_T(e)=c_T(e)+1$. If this makes $c_T(e)=w(e)$, then delete e from $E_0$.

INITIALIZE EDGE-SEARCHING FUNCTIONS—Step 2: called once per implementation of the main algorithm between Step 1b and Step 3a (1) A flag function $f(e)$ is used to keep track of whether a particular edge e has been processed by the New Community Loop. When $f(e)=0$, the edge has not been processed; when $f(e)=1$, the edge has already been processed. When $f(e)=1$ for all e in H, then the "flag" is "on", indicating that the loop has completed the building of the current potential community. Before the community building process begins, the flag must be initialized by setting $f(e)=0$ for all e in H.

(2) In partitioning graph H into smaller clusters, potential communities must be built. Before entering the community building loop, there are no potential communities yet. Initialize the number of the current potential community under construction to one: p=1.

MAIN JUNCTION—Step 3a: within the main algorithm, called first by Step 2; called by Step 4b after a new potential community is completed; called by Step 4-1b when community building is reset because the spanning forest is adjusted; followed by Step 3b or Step 5 (see description below).

Level-k communities are built from H (a level-(k-1) community), by building potential level-k communities $B_p$ using unsaturated edges. If all the unsaturated edges have been used ("YES"), then the list of potential level-k communities is complete and the algorithm can proceed to the final part of the main algorithm. The set $E_0$ is the list of as yet unused (not assigned to any $B_p$) unsaturated edges. If $E_0=\emptyset$ is TRUE, then the algorithm should stop potential community building and proceed to step 5. Otherwise ("NO"), there is more work to be done building potential communities, and the algorithm proceeds to step 3b.

INITIALIZE NEW COMMUNITY LOOP—Step 3b: called once before starting each New Community Loop by Step 3a; followed by Step 4-2b (note in the order of the numbering of the steps, this bypasses earlier parts of "Step 4").

(1) Though the goal is to find clusters of the vertices (corresponding to objects in the dataset), the potential clusters are initially defined by accumulating a list of edges whose vertices will make up the level-k cluster. To begin the process, an as yet unused (by this call of the main algorithm) edge is chosen (that is, an edge from $E_0$). One feature of the algorithm is that the final clustering does not depend on the order, so one can choose whichever edge is convenient from $E_0$. Denote this seed edge as $e_0 \in E_0$.

(2) The list of edges that belong to the new potential level-k community will be designated $B_p$. This list is initialized to contain just the seed edge: $B_p=\{e_0\}$.

(3) In order to adjust the forests as needed, a track record is necessary. This is made up of a sequence of indices of forests I(e), and a sequence of replacement edges S(e). When necessary, these will be used to swap edges between forests and $E_0$. At this stage, the first edge that may require swapping has been introduced: $e_0$. Currently, there are no candidate replacements, so the track record starts with only the current edge, $S(e_0)=e_0$, and there is no next edge, so the index of the tree of the next edge is empty: $I(e_0)=\emptyset$.

(4) For clarity, the initial seed, $e_0$, is differentiated from the edge currently under consideration in determining what edges should be added to $B_p$. The latter edge will be referred to as e' and here that is initialized: $e'=e_0$.

NEW COMMUNITY LOOP

UPDATE NEW COMMUNITY—Step 4-2b: called once from Step 3b at beginning of a new community loop, thereafter called by Step 4-2a; followed by Step 4a.

Note that the following sub-steps refer to multiple actions. In practice, an inner loop will be set up to find the circuit for each tree, and then another loop inside that loop will process each edge in each circuit.

() The set of spanning forests T was initially constructed to be maximal with respect to $E_0$. The first k-1 forests are full trees, which is to say they have the maximum number of edges possible to connect the vertices of H. In the case of the last forest, $T_k$, e' was chosen so that it does not connect disconnected components of $T_k$. In either case, adding any e' to a tree $T_i$ will produce a single circuit, specifically one containing e'. This circuit in $T_i+e'$ is designated as $C_i$ in this algorithm.

(2) Each circuit $C_i$ may contain edges not found in $B_p$. All these edges are important as new members of the current potential community. They must also be processed so as to build the track record that enables updating of sub-optimal spanning forests. Therefore it is important to process each properly. A particular edge will be referred to generically as e.

(3) As described above, the track record of each edge e in $C_i$ but not yet in $B_p$ must be created. This track record makes it possible to trace e back through a chain of edges that can be substituted to alter the trees. This track record is made up of a list of edges for e, S(e), and a list of indices that refer to the tree where e was found. Updating the edge list means adding the new edge e to the end of the list for the current edge being checked, e': set S(e)=S(e')e. This means that we append e to the end of the S(e') list. Updating the list of indices means adding the index of the current tree in which e was found to the list of the current edge being checked: I(e)=I(e')i. This means that we append i to the end of the I(e') list. The track record may also be referred to as a "track of replacement" for an edge e, which allows edges to be substituted recursively in the trees without requiring all trees to be reconstructed. (See Step 4-1a for the use of the track record.)

(4) The vertices of this new edge e are closely connected to those of vertex e' and thus to those of $e_0$ (as measured by being in the circuit created by adding edge e' to one of k (maximal) spanning forests). Therefore the vertices in question should be in the same level k community as those of e' and $e_0$. Add the new edge e by letting $B_p = B_p \cup \{$all e in the circuit of $T_i + e'$, for each $T_i \in T\}$.

(5) Update flags to reflect that e' has been checked and all the new edges from associated circuits have been added to the current potential group: $f(e')=1$.

FIND NEXT EDGE—Step 4a: called after each Step 4-2b; followed by Step 4b or Step 4c (see below).

The algorithm has finished updating new potential group $B_p$ using e' to include all vertices within k-levels of e'. Next it is necessary to determine if there are any edges in $B_p$ that have not yet been checked. Note that new edges may have been added since the last time this check was done. Therefore the algorithm searches through the edges in $B_p$ looking for an edge $e_1$ with $f(e_1)=0$. If such an edge is found ("YES"), it may at a later step become the next edge under consideration, e'; the algorithm proceeds to Step 4c. If all the edges have been checked, that is, if $f(e)=0$ for some e in $B_p$ ("NO"), then the flag is "on" and the current potential k-level is complete; the algorithm proceeds to Step 4b.

CHECK LAST FOREST—Step 4c: called only from a "YES" result (flag not "on") from Step 4a; followed by Step 4-1a or 4-2a (see below).

As described under 4-2b(1), the first k−1 forests are full trees, with the maximum number of edges possible to connect the vertices of H while the last forest, $T_k$, was constructed to be maximal with respect to $E_0$. This means that $T_k$ may not be a full tree; that is, it may be made up of disconnected components. The maximum condition implies that $e_0$ will not connect components of $T_k$; however edges in $B_p$ taken from the full trees may; therefore it is necessary to check them against $T_k$. If $e_1$ connects two components of $T_k$ ("YES"), the algorithm will go to 4-1a so that $T_k$ is updated and the building of the current community is restarted if possible. Otherwise, that is if $e_1$ does not connect two components of $T_k$, that is, both of the vertices of $e_1$ are already in the same component ("NO"), the New Community Loop continues and the algorithm proceeds to Step 4-2a.

USE EDGE (TO UPDATE COMMUNITY)—Step 4-2a: called only from a "NO" result from Step 4c; followed by Step 4-2b.

An edge e' in $B_p$ has been found that has not yet been processed by the New Community Loop and this edge does not join two components of the kth spanning forest, $T_k$. This edge should be processed to update potential new community $B_p$. The edge to be processed, e', is set to be unchecked edge $e_1$.

(End of NEW COMMUNITY LOOP)

COMMUNITY COMPLETE—Step 4b: called only from a "NO" result from Step 4a; followed by Step 3a.

(1) The current potential new community is complete: each edge in $B_p$ has been checked. Before proceeding to the construction of the next potential k-level community, the list of unused unsaturated edges must be updated by removing those in $B_p$ (because they are now being "used", not because they are not unsaturated). Set $E_0$ to $E_0 - B_p$.

(2) The pth potential community is finished. Increment the counter of the current potential community: increment p to p+1.

UPDATE FOREST—Step 4-1a: called only from "YES" result from Step 4c; followed by Step 4-1b.

(1) Because $e_1$ joins two components of spanning forest $T_k$, it is necessary to the algorithm that this forest be updated to make use of this edge. Note, by construction $T_k$ is maximal with respect to $E_0$; that is to say, if $e_1$ connects two components of $T_k$, it must be a saturated edge and so all copies of $e_1$ are currently being used by $T_1, \ldots, T_{k-1}$. Therefore in order to add a copy of $e_1$ to $T_k$, it is necessary to free $e_1$ from one of the full trees. This was the purpose of constructing a track record as edges were added to $B_p$. Specifically, the track record associated with $e_1$ is needed, $S(e_1)$ and $I(e_1)$. Suppose the track record has t edges, $S(e_1)=e_{i(1)}, e_{i(2)}, \ldots, e_{i(t)}$, and associated spanning tree index $I(e_1)=\mu_1, \mu_2, \ldots, \mu_{t-1}$. Then the update is carried out by updating the $\mu_j$ tree by adding $e_{i(j)}$ to and subtracting $e_{i(j+1)}$ from $T_{\mu j}$ for j from 1 to t−1. Note that $e_{i(1)}=e_0$ and $e_{i(t)}=e_1$, so the net result of the previous adjustment is to add $e_0$ to and subtract $e_1$ from $T_1, \ldots, T_{k-1}$ while keeping them spanning trees. Finally, the spanning forest $T_k$ is updated by adding $e_1$.

(2) The above adjustment moved one new copy of edge $e_0$ into T, so it is necessary to update the coverage for this edge by incrementing $c_T(e_0)$ to $c_T(e_0)+1$.

(3) Since the edges used in T, has changed, it may be necessary to update the set of (unused) unsaturated edges, $E_0$. If $c_T(e_0)=w(e_0)$ is TRUE, then the edge $e_0$ is saturated and is deleted from $E_0$.

UNMAKE CURRENT NEW COMMUNITY—Step 4-1b: called only from Step 4-1a; followed by Step 3a.

The process of making a new community was aborted because the spanning forest was not optimal. The previously seeding edge $e_0$ has since been used to adjust the spanning forest and the process of building the pth k-level community will be restarted from the beginning. However, it is important to note that previously constructed potential communities $B_q$ for q<p remain valid, as do completed communities, at this level as well is those that preceded it. This is an important feature of the algorithm, that the sub-optimal spanning forest can be updated without requiring the recalculation of any but the current potential new community of the current level.

(1) To reset the current potential community, first each edge e in $B_p$ needs to be marked as not yet considered: that is, the flag $f(e)$ is set to 0 (unchecked) for each e in $B_p$. Note that some of these edges may actually have been checked in the construction of an earlier potential k-level community, ones that overlapped $B_p$. In this implementation, not tracking where edges were checked was chosen over rechecking edges that have already been checked.

(2) The potential community itself is reset to empty: set $B_p$ to ∅.

COMPARE NEW COMMUNITIES—Step 5: called only from "YES" result from Step 3a; followed by Step 6a.

All potential new communities have been built. These are $B_1, B_2, \ldots, B_p$. These are sets of edges with associated vertices $V(B_i)$. The construction guarantees that all vertices associated with a particular set have the required minimum connectedness. It does not guarantee that there is not overlap between these potential communities. It is necessary to systematically go through each pair of groups, $B_i$ and $B_j$ for i,j=1, 2, ..., p with i≠j, and check whether they share any vertices. If so $(V(B_i) \cap V(B_j) \neq \emptyset$ TRUE) then these two pair of communities will be merged. This continues until there is no overlap between the vertices. For convenience, renumber these so there are p' communities and check for any: $B_1, B_2, \ldots, B_{p'}$. These are the k-level communities of the graph H.

It should be noted that the above communities do not necessarily include all vertices of H. The missing vertices were not included because the clustering process of the algorithm is based on collecting edges. Thus single vertex k-level clusters are not represented. This is not a problem because (1) these singletons will remain singletons at all remaining levels, and so no further processing is necessary, and (2) given the starting dataset and an output made up only of k-level communities, it can be immediately inferred that objects missing from the communities are singleton clusters. While an implementation of this algorithm might add in the singleton clusters at some point for inclusion in the output, the implementation being described here does not.

CHECK LEVEL—Step 6a: called only from Step 5; followed by Step 6b or Step 6c (see below).

If the current level is not the final level, then each k-level community needs to be broken down into k+1-level communities. The final level is h, a level chosen by the user of the algorithm at the beginning. If k=h is TRUE ("YES"), then the algorithm proceeds to output the current communities (Step 6b). Otherwise ("NO"), it must arrange to call the main algorithm for each new sub-graph (this done in Step 6c).

CALL NEXT LEVEL—Step 6c: called only from "NO" result of Step 6a; makes multiple calls to Step 1a (see below).

For the current graph H, the k-level communities have been found in the form of $B_1, B_2, \ldots, B_{p'}$. Since the algorithm has not reached the final h-level, the k+1-level communities must be constructed.

For each final k-level community $B_i$ found by partitioning H by the current call of the main algorithm:

(1) Find the sub-graph induced on G by $B_i$, symbolically represented as $G[B_i]$. The community $B_i$ is made up of edges, whereas a graph is made up of vertices and edges connecting the vertices. (There are also weights associated with the edges, but since these are the same as for the original G throughout the algorithm, these can be handled as a global constant and so nothing need be done with them here.) Formally, set H to be the graph with the vertex set $V(H)=V(B_i)$ (the vertices contained in the edges of $B_i$), and all edges of G with endvertices in V(H) (it contains $B_i$, and may be more than $B_i$), and the weights as before. (Note, at this stage it is appropriate to output H as a k-level community, an intermediate product of the algorithm.)

(2) To call the algorithm, it is also necessary to construct the spanning trees associated with the new sub-graph H. This is constructed by intersecting the current trees with the new H. This is also described as "restricting" the current trees to the new subgraph and is represented symbolically by $T=\{T_1|H, T_2|H, \ldots T_k|H\}$. Note that while $T_k$ may not be a full tree, $T_k$ restricted to H is a spanning tree of H; this is because, by construction, H is connected and no edge in H connects disconnected pieces of $T_k$ (otherwise the forest would have been updated by Step 4-1a and Step 4-2b).

(3) Call the main algorithm, passing the values of H, T, and k (to Step 1a).

Note that this step does not pass control to another step in the way other steps do. Rather, it makes multiple recursive calls to Step 1a. After all these calls are resolved (terminating in either new Step 6c's or Step 6b's), the current call of the main algorithm terminates.

OUTPUT—Step 6b: called only from "NO" result of Step 6a. No steps follow.

Output all $B_i$, each of which represents a level-h-community of G. This run of the main algorithm has terminated (though due to the recursive nature of the process, there may still be outstanding steps). The output may take any form, include printing, displaying on a display, recording to a memory or storage device or the output may be used as an input to another device or system or to control external devices or objects.

Example Processing of a Dataset

To see what partitioning by the number of connections with the above algorithm looks like, a simple example is useful. For this purpose, the dataset presented in FIG. 3 will be manipulated using the algorithm and with many of the steps illustrated graphically.

Figure 9:
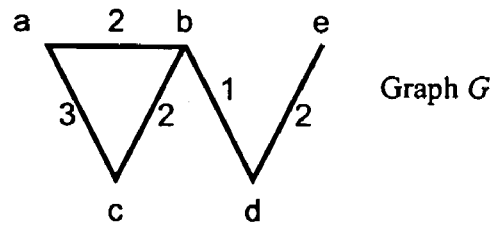
FIG. 9 is a visual representation of a dataset to be used in example processing according to the algorithm of FIG. 7 and FIGS. 8A-8C.
Figure 10:
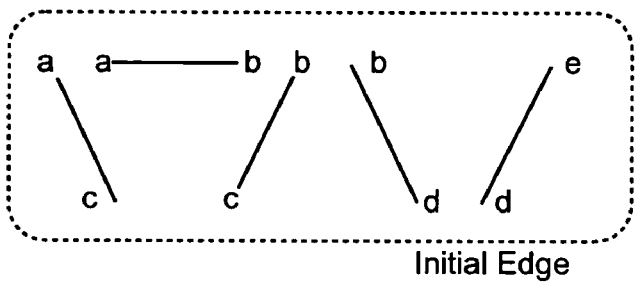
FIG. 10 is a visual representation of an initial edge set, $E_0$.

The dataset of FIG. 3 is reproduced in FIG. 9, and may be considered a visual representation of a graph, G. The dataset is made up of objects {a, b, c, d, e}. The relations are ab, ac, bc, bd and de with strengths/weights 2, 3, 2, 1 and 2 respectively. In this example, the clustering will be done to 3 levels.

The steps below correspond to the same steps in FIGS. 7 and 8A-8C, and reference may be taken to these Figures, and the above explanations, to illuminate the following process. In the earlier Figures and text, step labels were abbreviated, such as S1b, for Step 1b, and so forth.

Step 0: See FIG. 9

In step 0, the dataset of Graph G is input, resulting in the following:

Step 0a

Set vertices V(G)={a, b, c, d, e}

Set edges E(G)={ab, ac, bc, bd, de}

Set weights w(E(G))=[2, 3, 2, 1, 2]

Graph G defined by V(G), E(G), w(E(G))

Set h=3

The local variables for the main algorithm are also initialized to beginning values:

Step 0b:

Set k=0

(2) Set H=G (3) Set T={ }

(4) Set $c_T(E(G))=[0,0,0,0,0]$

Step 1: See FIGS. 10-13

In Step 1, the main algorithm is started, a first maximal spanning forest is created, and the list of unsaturated edges is updated to indicate what edges remain after building this first forest.

Figure 11:
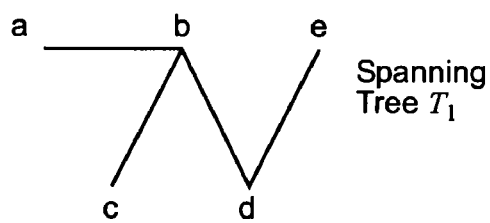
FIG. 11 is a visual representation of a first maximal spanning forest or tree, $T_1$.
Figure 12A:
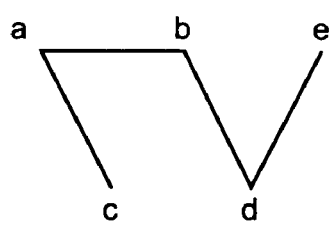
FIGS. 12A and 12B are visual representations of alternative spanning trees.
Figure 12B:
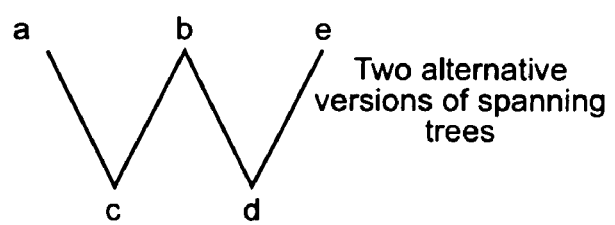

Step 1a: find first maximal spanning forest.
(1) First call of main algorithm: k=1
(2) Initially unsaturated edges are all edges (no trees): set $E_0$={ab, ac, bc, bd, de} (See FIG. 10). It should be noted that $E_0$ does not indicate the weight of the edges, only whether they are unsaturated.
(3) Call algorithm and get maximal spanning forest $T_1$, as shown in FIG. 11. FIGS. 12a and 12b show other possibilities for spanning forests that could have been used for $T_1$.

Figure 13:
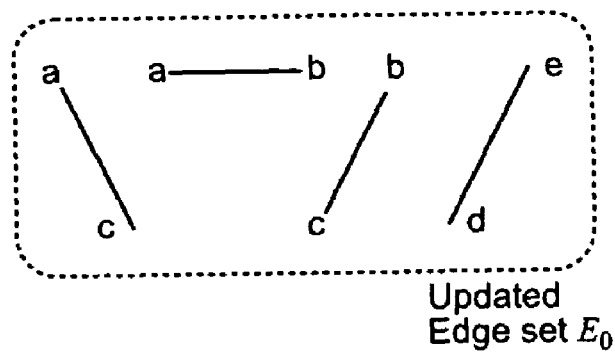
FIG. 13 is a visual representation of an updated edge set, $E_0$.

Step 1b: update for the new forest
(1) Set T={$T_1$}
(2) Set $c_T(E(H))=c_T${ab, ac, bc, bd, de})=[1,0,1,1,1]. Because the edge coverage for {bd} is equal to the original weight of {bd}, $c_T$(bd)=w(bd), all copies of {bd} have been used up by building $T_1$. Therefore, {bd} is removed from $E_0$, and $E_0$ is set to {ab, ac, bc, de}. The updated version of $E_0$ is shown in FIG. 13.

Step 2

In step 2, the edge-searching functions are initialized.
(1) Reset flag $f$({ab, ac, bc, bd, de})=[0,0,0,0,0]
(2) Get ready for first 1-level community: set p=1

Step 3

In step 3, a check is performed to see if all unused (not already in a potential new community) unsaturated (not used up by the spanning forests) edges are already assigned to a potential sub-cluster. If not, a new community loop is initialized.

Step 3a: check if all unsaturated edges are used
$E_0$ is not an empty set.
Step 3b: initialize new community loop
(1) Choose any unused unsaturated edge in $E_0$: set $e_0$=ab. The choice of edge is arbitrary at this point.
(2) Potential new community: set $B_1$={ab}
(3) Track Record: Set S(ab)=ab; Set I(ab) to be empty. S(ab) may be considered a seed edge and I(ab) is an index that indicates what tree the edge came from.
(4) Set e'=ab. e' is the edge currently being processed.

Step 4: See FIGS. 14-16

In step 4, the edge being processed is added to each tree (one in this case) to find what circuits are created.

Figure 14:
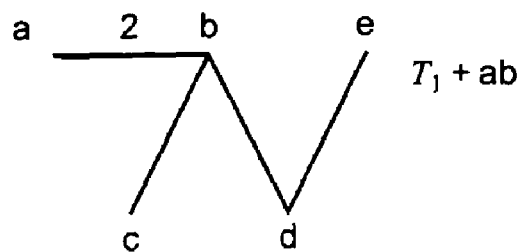
FIG. 14 is a visual representation of the first tree, $T_1$, with the first seed edge added thereto.
Figure 15:
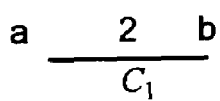
FIG. 15 is a visual representation of a first circuit, $C_1$.

Step 4-2b: Update the new Community
(1) As shown in FIG. 14, the seed edge is added to the first tree, $T_1$+ab. This creates circuit $C_1$, as shown in FIG. 15. The edges in this circuit are E($C_1$)={ab, ab}, where multiplicity is explicitly represented for convenience rather than introduce another weight variable.
(2) (3) (4) No new edge is found in this circuit, so these substeps are not performed (i.e. edge ab is already in $B_1$).
(5) The flag for edge {ab} is set to 1 to indicate the edge has been checked: Set $f$(ab)=1

Step 4a: Determine if any Edges in the Potential New Community have not been Checked.
All edges in $B_1$ (only contains {ab}) have been checked. So, there are no edges that have not been checked, resulting in a "NO" This indicates that Step 4b is next.

Figure 16:
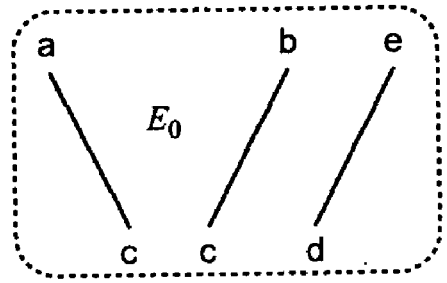
FIG. 16 is a visual representation of an updated edge set, $E_0$.

Step 4b: Community Complete
(1) Remove ab from $E_0$. Set $E_0$={ac, bc, de}. This results in $E_0$ as shown in FIG. 16.
(2) Set p=2

Step 3:
The process returns to step 3, a check is again performed to see if all unsaturated edges are already assigned to a potential sub-cluster. If not, a new community loop is initialized.
Step 3a: Check if all Unsaturated Edges are Used
$E_0$ not empty.
Step 3b: initialize new community loop
(1) Choose $e_0$=ac
(2) Potential new community set $B_2$={ac}
(3) Set S(ac)=[ac]; set I(ac) set to be empty
(4) Set e'=ac Step 4 (second community)
Step 4-2b (first pass)
(1) See FIG. 17 for $T_1$+ac, $C_1$. The edges E($C_1$)={ab, ac, bc}, as shown in FIG. 18.
(2) There are two edges not yet in $B_2$, ab and bc.
(3) Set S(ab)=[ac, ab], Set S(bc)=[ac, bc]; both edges from tree 1, Set I(ab)=[1], Set I(bc)=[1]. This indicates that {ac} can substitute for {ab} in tree 1 and tree 1 will still be a maximal spanning tree.
(4) Set $B_2$={ac, ab, bc}.
(5) Set $f$(ac)=1

Step 4a Determine if any Edges in the Potential New Community have not been Checked.
Currently $f$({ac, ab, bc})=[1,1,0], therefore $e_1$=bc has not been checked. So, there is an edge that has not been checked, resulting in a "YES". This indicates that Step 4c is next.

Step 4c
$T_1$ is made up of a single component (it is a tree, not a disconnected forest) so bc will not be used to update the spanning forests: "NO"

Step 4-2a
e'=bc

Step 4-2b (Second Pass)
(1) See FIG. 19 for $T_1$+bc, which results in $C_1$, as shown in FIG. 20 The edges E($C_1$)={bc, bc}.
(2) (3) (4) No new edge since only edge is bc, which is already in $B_2$.
(5) Set $f$(bc)=1

Step 4a
All edges in $B_2$ have been checked. $f$({ac, ab, bc})=[1,1,1] Therefore, there are no edges with the flag set to 0, resulting in a "NO", so that Step 4b is next.

Step 4b
(1) Remove new used edges ac and bc from $E_0$. This results in $E_0$={de}, as shown in FIG. 21
(2) Set p=3

Step 3a
$E_0$ is not empty, so the next step is 3b to process the next edge

Step 3b
(1) Choose only available edge, $e_0$=de
(2) Potential new community set $B_3$={de}
(3) Set S(de)=[de]; set I(de) set to be empty
(4) Set e'=de Step 4 (third community)
Step 4-2b
(1) See FIG. 22 for $T_1$+de, which results in $C_1$, as shown in FIG. 23. The edges E($C_1$)={de, de}.
(2) (3) (4) No new edge since only edge is de, which is already in $B_3$.
(5) Set $f$(de)=1

Step 4a
Currently $f(\{de\})=[1]$, therefore all edges have been checked and the community done, resulting in a "NO". Step 4b is next.
Step 4b
(1) Remove new used edge de from $E_0$, which results in $E_0=\{\ \}$, as shown in FIG. 24
(2) Set p=4
Step 3a
$E_0$ is empty, which results in a "YES", leading to Step 5.

Step 5: Merge overlapping communities
$B_1=\{ab\}$, $B_2=\{ac, ab, bc\}$, $B_3=\{de\}$
$B_1$ and $B_2$ overlap. Merge and renumber.
$B_1=\{ac, ab, bc\}$, $B_2=\{de\}$
No overlap. Merging done.

Figure 25:
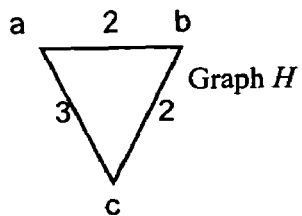
FIG. 25 is a visual representation of Graph H.
Figure 26:
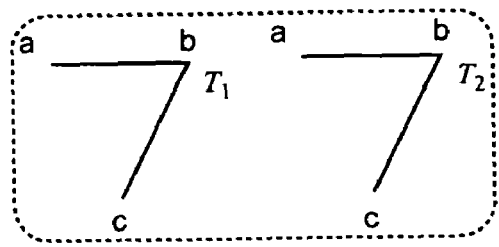
FIG. 26 is a visual representation of two trees, $T_1$ and $T_2$.

Step 6: Level check and increment
Step 6a
k=1≠3=h, so the clusters need to be further partitioned. This results in a "NO", leading to step 6c.
Step 6c: create new graph for next level.
(1) $H=G[V(B_1)]$, which means that the new graph is the sub-graph induced on G by $B_1$, as was explained previously. The new Graph H is shown in FIG. 25.
(2) $T=\{T_1|H\}$, which means that the current tree or trees are intersected with the new sub-graph, as explained previously. This results in the tree $T_1$ shown in FIG. 26.
k=1

Figure 27:
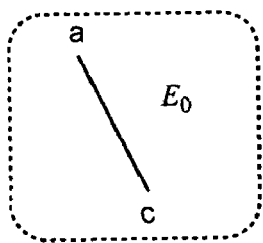
FIG. 27 is a visual representation of the updated edge set, $E_0$.
Figure 28A:
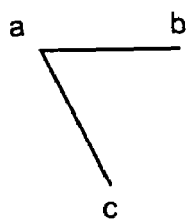
FIGS. 28A and 28B are visual representations of two alternative trees.
Figure 28B:
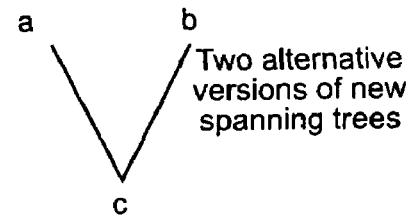

Step 1: Start Main Algorithm again
Step 1a
(1) Second level call of main algorithm: k=2
(2) $w(E(H))=w(\{ab, ac, bc\})=[2, 3, 2]$, $c_T(\{ab, ac, bc\})=[1,0,1]$. No saturated edges in E(H) yet. Set $E_0=\{ab, ac, bc\}$ (not in Figure).
(3) Call algorithm and get maximal spanning forest $T_2$ (shown in FIG. 26). FIGS. 28a and 28b shows other possibilities for spanning forests that could have been used for $T_2$.
Step 1b
(1) Set $T=\{T_1, T_2\}$
(2) Set $c_T(E(H))=c_T(\{ab, ac, bc\})=[2,0,2]$. Because the edge coverage for edges ab and bc are equal to the original weights, $c_T(ab)=w(ab)$, and $c_T(bc)=w(bc)$, ab and bc are removed from $E_0$ by setting $E_0$ to $\{ac\}$, as shown in FIG. 27).

Step 2: Initialize Edge Searching Functions
(1) Reset flag $f(\{ab, ac, bc\})=[0,0,0]$
(2) Get ready for first 2-level community: set p=1

Figure 29:
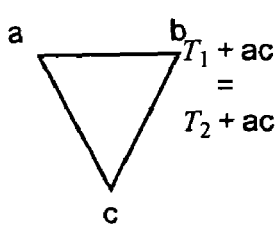
FIG. 29 is a visual representation of the tree $T_1$ or $T_2$ with an edge added thereto.
Figure 30:
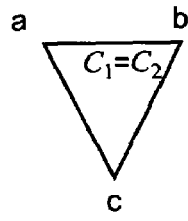
FIG. 30 is a visual representation of the circuits resulting therefrom.

Step 3: Check for unused unsaturated edges and start new community.
Step 3a
$E_0$ is not empty, resulting in a "NO"
Step 3b
(1) Choose any (there is exactly one) unused unsaturated edge in $E_0$: set $e_0$=ac
(2) Potential new community: set $B_1=\{ac\}$
(3) Set S(ac)=ac; Set I(ac) to be empty
(4) Set e'=ac Step 4: add edge to each tree and check for circuits
Step 4-2b
(1) See FIGS. 29 and 30 for $T_1+ac=T_2+ac=C_1=C_2$. The edges of $E(C_1)=\{ab, ac, bc\}$.
(2) ab and bc are new edges (i.e. not already in $B_1$).
(3) Set S(ab)=[ac, ab], Set S(bc)=[ac, bc]; both edges from tree 1, Set I(ab)=[1], Set I(bc)=[1].

Figure 31:
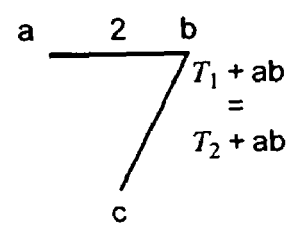
FIG. 31 is a visual representation of the tree $T_1$ or $T_2$ with a different edge added thereto.
Figure 32:
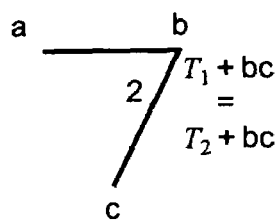
FIG. 32 is a visual representation of the tree $T_1$ or $T_2$ with yet a different edge added thereto.

(4) Set $B_2=\{ac, ab, bc\}$.
(5) Set $f(ac)=1$
Step 4a
Currently $f(\{ac, ab, bc\})=[1,0,0]$, therefore $e_1$=ab has not been checked, resulting in a "YES"
Step 4c
$T_2$ is made up of a single component (it is a full spanning tree, not a disconnected forest) so ab will not be used to update the spanning forests: "NO"
Step 4-2a
e'=ab
Step 4-2b
(1) See FIG. 31 for $T_1+ab=T_2+ab$. $C_2=C_1$ (not shown). $E(C_1)=\{ab, ab\}$
(2) No new edges.
(3) (4) (5) Set $f(ab)=1$
Step 4a
Currently $f(\{ac, ab, bc\})=[1,1,0]$, therefore $e_1$=bc has not been checked: "YES"
Step 4c
$T_2$ is spanning tree, so bc will not be used to update the spanning forests: "NO"
Step 4-2a
e'=bc
Step 4-2b
(1) See FIG. 32 for $T_1+bc=T_2+bc$, $C_1=C_2$ (not shown). $E(C_1)=\{bc, bc\}$
(2) no new edges.
(4) (5) Set $f(bc)=1$
Step 4a
Currently $f(\{ac, ab, bc\})=[1,1,1]$, therefore flag is "on": ("NO" remaining edges.)
Step 4b
(1) Remove new used edges ab, ac, bd from $E_0$. Set $E_0=\{\ \}$
(2) Set p=2

Step 3: Are all edges assigned
Step 3a
$E_0$ is empty. "YES"

Step 5: Merge overlapping communities
$B_1=\{ac, ab, bc\}$
No overlap. Merging done.

Step 6: Level check and increment
Step 6a
k=2≠3=h, clusters need to be further partitioned, resulting in a "NO"
Step 6c
Pass $H=G[V(B_1)]$, $T=\{T_1|H, T_2|H\}$, k=2 (See FIGS. 33 and 34)

Step 1: Start Main Algorithm again
Step 1a
Third level call of main algorithm: k=3.
(2) $w(E(H))=w(\{ab, ac, bc\})=[2, 3, 2]$, $c_T(\{ab, ac, bc\})=[2,0,2]$. Edges ab and bc are saturated so $E_0=\{ac\}$, as shown in FIG. 35.
(3) Call algorithm and get maximal spanning forest $T_3$ (shown in FIG. 34).
Step 1b
(1) Set $T=\{T_1, T_2, T_3\}$
(2) Set $c_T(E(TH)=c_T\{ab, ac, bc\})=[2,1,2]$. Edge $c_T(ac)\neq w(ac)$ so no change to $E_0$.

Step 2: Initialize Edge Searching Functions
(1) Reset flag $f(\{ab, ac, bc\})=[0,0,0]$
(2) Get ready for first 3-level community: set p=1

Figure 41:
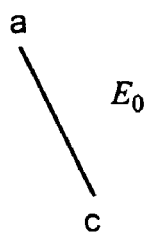
FIG. 41 is a visual representation of the updated edge set, $E_0$.

Step 3: Check for unused unsaturated edges and start new community.
  Step 3a
  $E_0$ not empty. "NO"
  Step 3b
  (1) Choose any (there is exactly one) unused unsaturated edge in $E_0$: set $e_0$=ac
  (2) Potential new community: set $B_1$={ac}
  (3) Set S(ac)=ac; Set I(ac) to be empty
  (4) Set e'=ac Step 4: add edge to each tree and check for circuits
  Step 4-2b
  (1) See FIG. 36 for $T_1$+ac=$T_2$+ac=$C_1$=$C_2$. See FIGS. 37 and 38 for $T_3$+ac=$C_3$. The edges $E(C_1)$={ab, ac, bc}.
  (2) ab and bc are new edges.
  (3) Set S(ab)=[ac, ab], Set S(bc)=[ac, bc]; both edges from tree 1, Set I(ab)=[1], Set I(bc)=[1].
  (4) Set $B_1$={ac, ab, bc}.
  (5) Set $f$(ac)=1
  Step 4a
  Currently $f$({ac, ab, bc})=[1,0,0], therefore $e_1$=ab has not been checked, resulting in a "YES"
  Step 4c
  $T_3$ is made up of two components, ac (and the associated vertices) and b. Adding ab would connect the disconnected component. Therefore the tree should be updated: "YES"
  Step 4-1a See FIG. 39
  (1) S(ab)=[ac, ab], I(ab)=[1].
  Update by updating $T_1$ (because 1 is the first and only index element in I(ab)) by adding the ac (it is the corresponding first edge element of S(ab)) and subtracting ab (the next edge element of S(ab)). Update last forest $T_3$ by adding ab (last edge of S(ab)). (See left of FIG. 40.)
  (2) Add 1 to coverage of edge ac, the edge added to the spanning forests from $E_0$.
  Set $c_T$(ac)=1+1=2
  (3) w(E(H))=w({ab, ac, bc})=[2, 3, 2], $c_T$({ab, ac, bc})=[2,2,2]. Since $c_T$(ac)=2<3=w(ac), edge ac is not saturated, and thus is not removed from $E_0$. The unchanged $E_0$ is shown in FIG. 41
  Step 4-1b
  (1) Reset $B_1$={ac, ab, bc} by first setting $f$({ac, ab, bc})=[0,0,0].
  (2) Set $B_1$ to { }.

Figure 42:
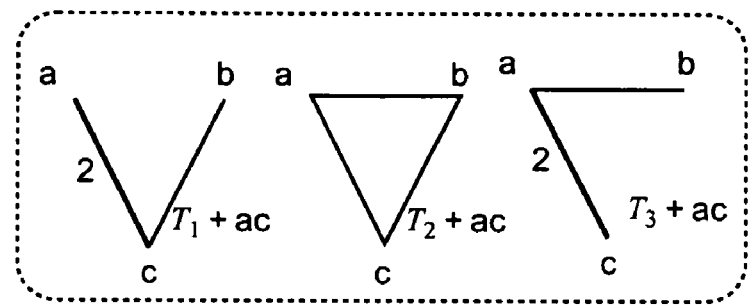
FIG. 42 is a visual representation of the trees $T_1$, $T_2$ and $T_3$ with an edge added thereto.

Step 3: Check for unused unsaturated edges and start new community.
  Step 3a
  $E_0$ is not empty, resulting in a "NO"
  Step 3b
  (1) Choose any (there is exactly one) unused unsaturated edge in $E_0$: set $e_0$=ac
  (2) Potential new community: set $B_1$={ac}
  (3) Set S(ac)=ac; Set I(ac) to be empty
  (4) Set e'=ac Step 4: add edge to each tree and check for circuits
  Step 4-2b
  (1) See FIG. 42 for $T_1$+ac, $T_2$+ac, $T_3$+ac. Circuits (not shown) $C_1$=$C_3$={ac, ac} and $C_2$={ab, ac, bc}.
  (2) As with the previous attempt to build $B_i$, ab and bc are new edges.
  (3) Set S(ab)=[ac, ab], Set S(bc)=[ac, bc]; both edges from tree 1, Set I(ab)=[1], Set I(bc)=[1].
  (4) Set $B_1$={ac, ab, bc}.
  (5) Set $f$(ac)=1

Remaining Step 4:
  Both ab and bc are processed, but neither adds any edges to potential group, since it already contains everything, and neither improves $T_3$ since it is already a full tree. The potential group B, is finished.

Step 3a and Step 5
  No unsaturated edges remain. There is no overlapping since only one $B_p$.

Figure 43:
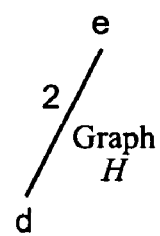
FIG. 43 is a visual representation of Graph H.

Step 6: Level Check
  Step 6a
  k=3=h is TRUE, resulting in a "YES"
  Step 6b
  Output $B_1$.
  (end of first k=3)
  Step 6c
  (end of first k=2)
  Step 6c (k=1 Continues)
  Pass H=G[V($B_2$)]={de}), T={$T_1$|H}, k=1 (See FIG. 43).

Figure 44:
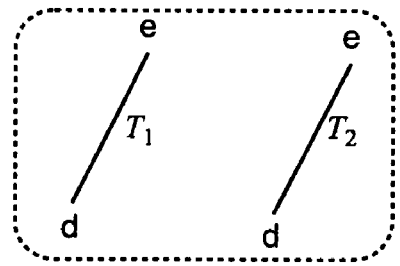
FIG. 44 is a visual representation of two trees, $T_1$ and $T_2$.

Step 1: See FIG. 43
  Step 1a
  (1) Second, second level call of main algorithm: k=2
  (2) w(E(H))=w({de})=[2], $c_T$({de})=[1]. No saturated edges in E(H) yet. Set $E_0$={de} (not in Figure).
  (3) Call algorithm and get maximal spanning forest $T_2$ (shown in FIG. 44).
  Step 1b
  (1) Set T={$T_1$, $T_2$}
  (2) Set $c_T$(E(H))=$c_T$({de})=[2]. Edge $c_T$(de)=w(de), therefore no edges in $E_0$.

Step 2, Step 3
  No unused unsaturated edges.

Step 5: Merge overlapping communities
  No level-2 communities

Step 6: Level Check
  Step 6a
  k=2≠h. "NO"
  Step 6c
  No level-2 communities
  (end of second k=2)
  Step 6c
  (end of original k=1)

(END OF ALGORITHM)
OUTPUT CLUSTERS

| Level 0 | Level 1 | Level 2 | Level 3 |
|---|---|---|---|
| {a, b, c, d, e} | {a, b, c} | {a, b, c} | {a, b, c} |
| | {d, e} | {d} | {d} |
| | | {e} | {e} |

An Alternative Algorithm for Implementation

Figure 45:
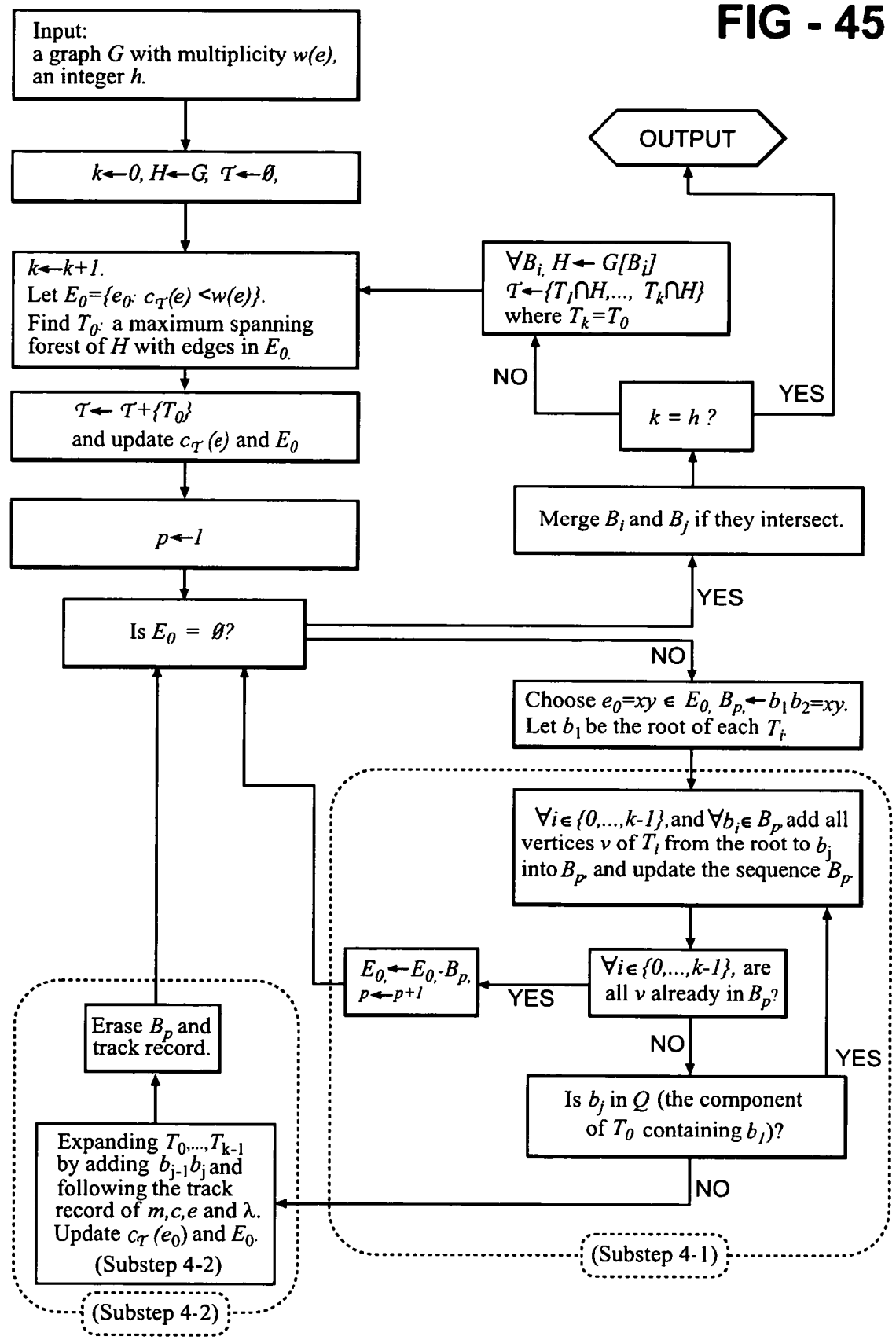
FIG. 45 is a flowchart showing an alternative embodiment of the algorithm according to the present invention.

The above described algorithm shows the most basic and fundamental ideas of the processing approach according to the present invention. Following the same ideas, it can be further modified and improved for a lower complexity. Algorithm 2, shown in FIG. 45, and introduced in this section, is one of several modified versions of the basic algorithm with the complexity $O(n^2h^2)$ where n is the number of vertices of the input graph G and the goal of the processing is to find all level-h communities in G.

Notation and Label System

In order to have a lower complexity, an alternative version has a more complicated data structure and the corresponding label system than the basic one.

The following is a list of a brief description of the data structure and the corresponding label system in this alternative algorithm.

1. The set $B_p$ in the Algorithm of FIG. 7 collects edges that are replaceable with an unsaturated edge $e_0$. In the following algorithm (Algorithm 2, FIG. 45), the set $B_p$ collects vertices that edges of $G[B_p]$ are replaceable with $e_0$.

Furthermore, for the purpose of reducing the complexity, the set $B_p$ is created as a sequence (in Substep 4-1) so that the ordering of elements of $B_p$ clearly indicates when and how those vertices were selected into the set $B_p$.

2. The adjustment sequences S(e) and I(e) will be created when they are needed (in the Substep 4-2) based on the information generated in Substep 4-1.

3. For the purpose of reducing complexity, the forests of T are all considered as rooted forests. An end-vertex of an unsaturated edge $e_0$ is the root.

Main Program of Algorithm 2

Input: A graph G with w(e) as the multiplicity for each edge e and an integer h.

Goal: find all level-h communities in G.

Step 0. Start at k=0 (the program runs until k=h level is complete), H←G (a level-0 community), T←Ø (the set of spanning trees in H) and $c_T(e)$=0 for all e in E(G).

Step 1.

k←k+1.

(Note: if k>1, T={$T_1, \ldots, T_{k-1}$} is a set of edge-disjoint spanning trees of H, and $c_T(e)$ is the coverage of each edge. These are outputs of Step 6 in the previous iteration of the main loop of the algorithm. When k=1, no spanning tree preexists).

Let $E_0$ be the set of edges (unsaturated edges) e with $c_T(e)$<w(e).

Find a maximum spanning forest $T_0$ in H consisting of edges of $E_0$.

Let T←T+{$T_0$} and update the coverage $c_T(e)$ and $E_0$ as follows: $c_T(e)$←$c_T(e)$+1 if e is an edge of $T_0$, otherwise, $c_T(e)$=$c_T(e)$ (no change), and delete all edges e in $E_0$ such that $c_T(e)$=w(e).

Go to Step 2.

Step 2.

Let p←1 and go to Step 3.

Step 3. If $E_0$=Ø then go to Step 5.

Otherwise, go to Step 4.

Step 4.

Pick any $e_0$=xy∈$E_0$. Let $B_p$←$b_1 b_2$ where bus x and $b_2$←y.

Let Q be the component of $T_0$ containing xy.

Let x be the root of each $T_i$ (i>0) and Q.

Go to Substep 4-1.

Substep 4-1 (The Substep for searching of replaceable edges). (See Subprogram 4-1 for detail.)

Outline and description. For each i∈{0, 1, ..., k−1}, and for each $b_j$∈$B_p$, add all vertices of the directed path in $T_i$ from $b_1$=x to $b_j$ into $B_p$.

For every new vertex $b_j$ added into $B_p$, always check: whether or not $b_j$∈Q. If NOT, then stop the iteration of Substep 4-1 and go to Substep 4-2. Repeat this Substep until no new vertex can be added into $B_p$, then $$H \leftarrow H/B_p,\ E_0 \leftarrow E_0|H,\ p \leftarrow p+1$$

and go to Step 3 (starting a new search for another level-k community). (Note, $H/B_p$ is the graph obtained from H by identifying all vertices of $B_p$ as a single vertex; $E_0|H$ is the set of edges of $e_0$ contained in the newly contracted graph H.) The new vertex of H created by contracting $B_p$ is denoted by $z_p$.

Note, during the iteration, each new vertex $b_i$ added into $B_p$ is labeled with m($b_i$), ε($b_i$) and λ($b_i$), which are to be used in creating the adjustment sequences S and I in Substep 4-2 in case that the spanning forest $T_0$ can be expanded. (For definitions of labels m, ε and λ, see Subprogram 4-2 for detail.)

Substep 4-2 (The Substep for expanding $T_0$.) (See Subprogram 4-2 for detail.) Outline and description. Create the adjustment sequences S(e) and I(e) based on the labels m($b_i$), ε($b_i$) and λ($b_i$) generated in Substep 4-1 (See Subprogram 4-1).

Follow the adjustment sequences S and I to adjust and expand the forests of T.

And update the coverage $c_T$ for the edge $e_0$.

Let $B_p$←Ø and erase labels m($b_i$), ε($b_i$) and λ($b_i$) for all vertices of H.

Go to Step 3.

Step 5.

Let {$v_1, \ldots, v_r$} be the vertex set of the resulting graph H (which has gone through a series of contractions in Step 4-1-2). Each vertex $v_i$ is a child of H in the hierarchical tree, some of which are single vertices, while others represent non-trivial level-k communities.

If $v_i$ is not a contracted vertex, then it is a child of H in the hierarchical tree, and no further action is needed for this vertex.

For a contracted vertex $v_i$=$z_p$, replace $v_i$ with the corresponding community $B_p$ and go to Step 6 for further iteration. Note that it is possible that some vertex of $B_p$ is also a contracted vertex $z_{p'}$. In this case, all vertices of $B_{p'}$ should be added into $B_p$. This procedure should be repeated for all possible contracted vertices in $B_p$.

Step 6.

If k=h, output all $B_i$, each of which induces a level-h community of G.

If k<h, then repeat Step 1 for H←G[$B_i$] for every i, $T_k$←$T_0$, and T={$T_1|H, T_2|H, \ldots, T_k|H$} which is a set of edge-disjoint spanning trees in H (as inputs of Step 1 for the next iteration of the algorithm at level (k+1)).

Subprogram 4-1: The Search of Replaceable Edges (Substep 4-1)

The subprogram in this subsection is the detailed Substep 4-1 of Algorithm 2.

Some notation and labels used in this subprogram are to be introduced:

For the sake of convenience, non-negative integers μ are represented by an ordered integer pair (α, β) where μ=αk+β with 0≤β≤k−1 and α≥0. In order to distinguish the different presentation of integer numbers, let $M_k$ be the set of all those ordered integer pairs (that is $M_k$={0,1,2, ... }×{0,1, ..., k−1}=$Z^+$×$Z_k$).

$B_p$=$b_1 b_2 \ldots b_{D_e}$ is a sequence consisting of vertices of H that are already selected for the p-th potential community. $b_{D_e}$ is the last vertex of the sequence at the current stage.

m($b_i$)(∈$M_k$) is an integer label of $b_i$∈$B_p$: If m($b_i$)=(α, β), then the second component β of m($b_i$) indicates that the vertex $b_i$ is contained in the circuit of $T_\beta+e$ where $e$ is an edge joining two vertices $b_h$, $b_j$ of $B_p$ for some pair of indices h, j<i.

$\epsilon(b_i)(\in Z^+)$ is an integer label of $b_i$ in $B_p$: $b_{\epsilon(b_i)}$ is a vertex in $B_p$ and is also a child of $b_i$ in a rooted tree $T_\beta$ such that $b_i$ is added into $B_p$ because one of its children, $b_{\epsilon(b_i)}$, was already in $B_p$. The edge $b_i b_{\epsilon(b_i)}$ is to be used for possible expansion of $T_0$.

$\lambda(b_i)(\in Z^+)$ is also an integer label of $b_i \in B_p$:

$\lambda(b_i)=\min \{j: b_j \in D(T_\beta; b_i)\}$ where $m(b_i)=(\alpha, \beta)$ and $D(T_\beta; b_i)$ is the set of all descendants of $b_i$ in the rooted tree $T_\beta$. Then the vertex $b_i$ is in the circuit of $T_\beta+b_h b_j$ where $h=\lambda(b_i)$ and $b_j$ is not a descendant of $b_i$. Furthermore, $j=\epsilon(b_h)$ and $b_h b_j$ is an edge contained in a tree $T_{\beta'}$ where $m(b_h)=(\alpha', \beta')$.

Labels m, $\epsilon$ and $\lambda$ are to be used in Substep 4-2 for creating the adjustment sequences S and I.

There are some other auxiliary notation in the subprogram for the purpose of generating labels m, $\epsilon$ and $\lambda$, and the purpose of reduction of complexity.

Current status $m_C$ ($\in M_k$) is an indicator that indicates the current working status. At the initial situation, $m_C=(0,0)$. When $m_C=(\alpha, \beta)$, the second component $\beta$ indicates that the tree $T_\beta$ is currently in the iteration of Substeps 4-1-3, 4-1-4, 4-1-5 and 4-1-6.

A "working zone" of Subprogram 4-1 is a subsequence $b_{D_s}$, $b_{D_s+1}, \ldots, b_{D_e}$ of $B_p$: $D_s=\min\{j: m(b_j) > m_C-(1,0)\}$.

The Substep 4-1-5 is to be processed along the working zone instead of entire sequence $B_p$. The use of "working zone" will eliminate some unnecessary search along the sequence $B_p$ and therefore, reduce the complexity of the algorithm.

$c(b_i)$: a (temporary) carry-on label for generating $\lambda$.

Subprogram 4-1 (The expansion of $B_p$)

Subsubstep 4-1-1.
  $D_s \leftarrow 2$, $D_e \leftarrow 2$,
  $m(x)=m(y) \leftarrow (0,0)$,
  and $m_C \leftarrow (0,1)$.

Subsubstep 4-1-2. (Check whether the expansion of $B_p$ is ended.)
  If $m(b_{D_e}) \leq m_C-(1,0)$ then
    $H \leftarrow H/B_p$, $E_0 \leftarrow E_0|H$, $p \leftarrow p+1$ and go to Step 3 of Algorithm 2 (starting a new search for another level-k community). (Note, $H/B_p$ is the graph obtained from H by identifying all vertices of $B_p$ as a single vertex; $E_0|H$ is the set of edges of $E_0$ contained in the newly contracted graph H.) The new vertex of H created by contracting $B_p$ is denoted by $z_p$.

Otherwise, go to Substep 4-1-3 and continue.

Subsubstep 4-1-3.
  $i \leftarrow D_s$,
  and let $m_C=(\alpha_C, \beta_C)$.

(In the rooted tree $T_{\beta_C}$, all ancestors of vertices in the working zone will be added into the sequence $B_p$ in Subsubstep 4-1-6.)

Subsubstep 4-1-4. (Update $D_s$ for the next iteration in the tree $T_{\beta_C+1}$.)
  If $m(b_i) < m_C-(0, k-2)$, then $D_s \leftarrow i$, otherwise, $D_s$ remains the same.

Continue.

Subsubstep 4-1-5. (Update $c(b_i)$ if it does not exist.)
  If $c(b_i)$ does not exist, then $c(b_i) \leftarrow i$.
  Otherwise, do nothing.
  Continue.

Subsubstep 4-1-6. (Adding vertices into $B_p$ and labeling new vertices with $\lambda$.)
  Find the parent v of $b_i$ in the rooted tree $T_{\beta_C}$.
  Case 1. $v \notin B_p$. (This vertex v is to be added into $B_p$.)
    Subcase 1-1. If $v \notin Q$ then the spanning forest $T_0$ is now ready for expansion (and the expansion of $B_p$ stops): go to Substep 4-2 of Algorithm 2.
    Subcase 1-2. If $v \in Q$ then this new vertex v is to be added at the end of the sequence $B_p$ and all labels are to be updated for this new vertex as follows:

$D_e \leftarrow D_e+1$, $b_{D_e} \leftarrow v$, $\lambda(b_{D_e}) \leftarrow c(b_i)$, $c(b_{D_e}) \leftarrow c(b_i)$, $\epsilon(b_{D_e}) \leftarrow i$.

And
  $i \leftarrow +1$ and go to Substep 4-1-4 (repeating for the next $b_i$ in the sequence).

Case 2. $v \in B_p$, say $v=b_j$, and $j>i$.
  $c(b_j) \leftarrow \min\{c(b_j), c(b_i)\}$
  if $c(b_i)$ exists; or
  $c(b_j) \leftarrow c(b_i)$
  if $c(b_i)$ does not exist.

And
  $i \leftarrow i+1$
  and go to Subsubstep 4-1-4.

Case 3. $v \in B_p$, say $v=b_j$, and $j<i$.
  Check whether $b_i$ has reached the end of the working zone as follows.
  If $i=D_e$, then
    $m_C \leftarrow m_C+(0,1)$,
  and erase all of "carry-on" label c, and go to Subsubstep 4-1-2.
  If $i<D_e$, then
    $i \leftarrow i+1$
  and go to Subsubstep 4-1-4.

Remarks about Subprogram 4-1

Fact. The label m of vertices in the sequence $B_p$ form an non-decreasing sequence. That is,
  $m(b_1) \leq m(b_2) \leq \ldots \leq m(b_{D_e})$.

Fact. Whenever the Subsubstep 4-1-3 starts, the induced subgraph $G[B_p]$ is connected, and, furthermore, $B_p$ induces a connected subtree of $T_{\beta_C-1}$.

Fact. During Substep 4-1-6, those vertices $b_i$ with $m(b_i) \leq m_C-(1,0)$ induces a connected subtree of $T_{\beta_C}$.

Fact. During Substep 4-1-6 Case 1, new vertices added into $B_p$ are along a path in T from a pre-existing vertex by of $B_p$ to the root $b_1=x$, where,
  $m_C-(0,k-1) \leq m(b_j) \leq m_C-(0,1)$.

Fact. A vertex $b_i \in B_p$ with $i \geq 3$ is added into $B_p$ because it is in the circuit of $T_\beta+b_h b_j$ where $h=\lambda(b_i)$, $b_h$ is a descendant of $b_i$ in the rooted tree $T_\beta$ with the smallest subscript h, and $b_j$ is not a descendant of $b_i$ in the tree $T_\beta$. Furthermore, $j=\in (b_h)$ and $b_h b_j$ is an edge contained in a tree $T_{\beta'}$ where $m(b_h)=(\alpha',\beta')$.

Subprogram 4-2: Expansion of T (for Substep 4-2, Expansion for $T_0$)

At this stage, the inputs are (outputs of Substep 4-1-6, Subcase 1-1): $m_C=(\alpha_C, \beta_C)$, a vertex $v \notin Q$ and is the parent of $b_i \in B_p$ in the rooted tree $T_{\beta_C}$.

Subsubstep 4-2-1. Let
  $b_{D_e+1} \leftarrow v$, $\lambda(b_{D_e+1}) \leftarrow c(b_i)$, $\in(b_{D_e+1}) \leftarrow i$.

Subsubstep 4-2-2.

Set an edge-sequence S and an index-sequence I as follows:

$$S=(b_{i_1}b_{i_1*}), (b_{i_2}b_{i_2*}), \ldots, (b_{i_t}b_{i_t*});$$

$$I=\beta_{i_1}, \beta_{i_2}, \ldots, \beta_{i_{t-1}}$$

where $$i_l^*=\epsilon(b_{i_l}), i_{l+1}=\lambda(b_{i_l}) \text{ and } m(b_{i_l})=(\alpha_{i_l}, \beta_{i_l})$$

for each l=1, ..., t−1, and $$b_{i_1}=b_{D_e+1}, b_{i_1*}=b_i, \text{ and } (b_{i_t}b_{i_t*})=(b_2b_1).$$

(That is, for each $1 \leq t-1$, each $b_{i_t*}$ is a child of $b_{i_l}$ in the rooted tree $$T_{\beta_{i_l}},$$

each $b_{i_{l+1}}$ is a descendent of $b_{i_l}$ in the rooted tree $$T_{\beta_{i_l}}$$

with the smallest subscript $i_{l+1}$ in $B_p$.)

Subsubstep 4-2-3.

For each μ=(t−1), (t−2), ..., 3, 2, 1 (note, in the reversed order):

$$T_{\beta_{i_\mu}} \leftarrow T_{\beta_{i_\mu}} + (b_{i_{\mu+1}} b_{i^*_{\mu+1}}) - (b_{i_\mu} b_{i^*_\mu}).$$

And $$T_0 \leftarrow T_0 + (b_{i_1} b_{i_1*}).$$

Subsubstep 4-2-4. Update the coverage:

$c_T \leftarrow c_T(e)+1$ if $e=e_0$ (and delete $e_0$ from $E_0$ if $c_T(e_0)=w(e_0)$), and $c_T \leftarrow c_T(e)$ otherwise. Erase labels: $B_p$, $D_s$, $D_e$, m, $m_C$, λ, ε, c and back to Step 3.

Remarks about Subprogram 4-2

In Subsubstep 4-2-2 (the construction of adjustment sequences S and I), $$i_1 > i_1^* \geq i_2 > i_2^* \geq \ldots \geq i_t = 2 > i_t^* = 1.$$

And $$(b_{i_\mu} b_{i^*_\mu}) \in T_{\beta_{i_\mu}}$$

for each μ=1, ..., t−1, and is an edge contained in $$T_{\beta_{i_\mu}} + (b_{i_{\mu+1}} b_{i^*_{\mu+1}}).$$

Similar to the basic Algorithm (with the argument of replaceability and fixed frame of references), we are also able to show that each $$T_{\beta_{i_\mu}}$$

in Subsubstep 4-2-3 remains as a tree/forest.

Additional Aspects of Invention

Various aspects of the present invention have been described above as an algorithm or mathematical approach. Embodiments of the present invention further include a method incorporating the algorithm as a step or steps, and further including input and output of data or results. The present invention also includes a computer program incorporating the algorithm or method, as well as a computing device running such a program and/or a processor programmed to perform the algorithm or method and/or output of data or results in a tangible form, such as on machine readable medium and/or use of such results to manipulate further devices or operations.

Figure 46:
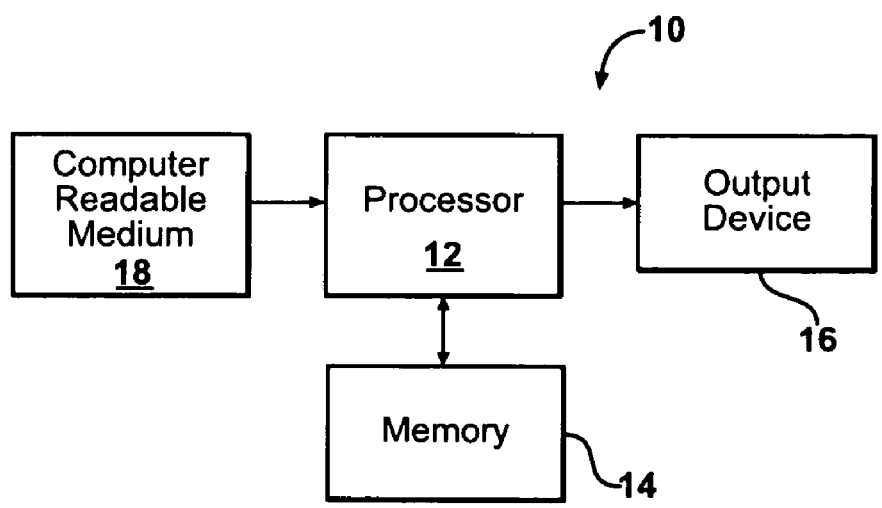
FIG. 46 is a schematic representation of a system according to a further aspect of the present invention, the system including a processor, a memory, an output device and a computer readable medium.

FIG. 46 is a schematic representation of a system according to a further aspect of the present invention. The system 10 includes a processor 12, a memory 14, an output device 16 and a computer readable medium 18. The system may take the form of or include a general or special purpose computer. The processor 12 may take any form and the memory 14 may be separate or integrated therewith. The output device 16 may be a display, a printer, a recording or storage device, or may take other forms. The computer readable medium 18 may take any form and preferably has computer executable instructions embodied thereon for performing the method of one or more of the algorithms described therein. The computer executable instructions are carried out by the processor. The medium 18 may be integrated with the rest of the system, or may be separate therefrom. The invention yet further includes a computer readable medium, such as a magnetic or optical storage medium, having a program such as described herein embodied on the medium.

Embodiments of the present invention include a method of analysis of data sets, such as genomic data, social science data, pharmaceutical data, chemical data and other data, using a computer or processor to analyze the data, resulting in identification of relationships, as described herein, such as relatedness of genomic, social science or chemical data and/or output of such results.

The various patents, patent applications, publications and other references mentioned herein are incorporated herein, in their entirety, by reference, as if reproduced herein. Those of skill in the art will appreciate that these incorporated references may provide additional approaches to accomplishing some steps of the present invention and provide teaching to assist in practicing the present invention.

Further variations on the herein discussed embodiments of the present invention will be clear to those of skill in the art. Such variations fall within the scope and teaching of the present invention. It is the following claims, including all equivalents, which define the scope of the present invention.

What is claimed is:

1. A computer based method of clustering related data representing a plurality of objects of interest and information about levels of relatedness between pairs of the objects, the computer based method comprising:

establishing on a computer a weighted graph G having a plurality of vertices and a plurality of weighted edges each joining a pair of the vertices, each vertex representing an object of interest and each edge having an integer weight w(e) representing a level of relatedness between the corresponding objects of interest and representing a set of w(e) parallel edges e joining the pair of vertices;

finding, on the computer, for a given integer k, exactly all possible subgraphs H of G satisfying the following dynamic "edge-to-vertex" ratio:

$$\min_{\forall P} \frac{|E(H/P)|}{|P|-1} > k$$

where the minimum is taken over all possible partitions P of the vertex set of H, and E(H/P) is the set of edges crossing between parts of P;

identifying each subgraph H found as a level-k community if it is maximal, wherein a subgraph H is defined as maximal if there are no larger subgraphs containing it that satisfy the dynamic "edge-to-vertex" ratio for the same k; and outputting from the computer all level-k communities, wherein the level of relatedness between all pairs of the objects of interest within each level-k community is greater than k.

2. The computer based method of claim 1, wherein the level of relatedness between objects of interest represents a similarity or closeness between the objects of interest.

3. The computer based method according to claim 1, wherein finding all possible subgraphs H of G further comprises:

finding maximal subgraph H that, for every edge e, H−e contains k edge-disjoint spanning trees.

4. The computer based method according to claim 1, wherein G is the only level-0 community and finding all possible subgraphs H of G further comprises:

finding all level-k communities within a previously found level-(k−1) community; and repeating the finding step for k←k+1 until only single vertices remain.

5. The computer based method according to claim 4 wherein finding all level-k communities within a level-(k−1) community H comprises:

a) letting $T_1, T_2, \ldots, T_{k-1}$ be edge-disjoint spanning trees of H;

b) finding a spanning forest $T_k$ in $$H - \bigcup_{i=1}^{k-1} E(T_i);$$

c) finding an edge e that is not used up in the set of $T_i$ for all i=1, ..., k, the edge being a seed edge;

d) establishing an edge subset $B_p$, starting with p=1, which initially contains the seed edge e;

e) expanding the subset $B_p$, recursively, for each $T_i$ and each e'∈ $B_p$, by adding all edges e* of any circuit in $T_i$+e';

f) repeating step (e) until either;

(Case 1) $B_p$ connects two unconnected portions of $T_k$; or (Case 2) $B_p$ does not connect two unconnected portions of $T_k$ and, for every $T_i$ and every e'∈ $B_p$, the circuit in $T_i$+e' contains no edge joining the same vertices as any edge in $B_p$;

g) if Case 1 of step (f) occurs, adjusting the set of spanning forests $\{T_1, T_2, \ldots, T_k\}$ and expanding the spanning forest $T_k$ and, thereafter, repeating step (c) for the adjusted set of forests $\{T_1, T_2, \ldots, T_k\}$;

h) if Case 2 of step (f) occurs, storing the subset $B_p$ and setting p←p+1 and repeating step (c) with an edge e that also does not join the same vertices as any edge in any of $B_1, B_2, \ldots B_{p-1}$;

i) merging $B_p$s that overlap; and j) outputting the set of subgraphs induced by stored subsets $B_p$ resulting from step (i), each of which is a level-k community of G and contained in H.

6. The computer based method according to claim 5, wherein expanding the forest $T_k$ in step (g) further comprises:

recording a track of replacement for every edge of $B_p$; and following the recording of the track of replacement: adjusting the set of forests $\{T_1, T_2, \ldots T_k\}$ by adding the seed edge, thereby expanding the spanning forest $T_k$ by connecting unconnected portions of $T_k$.

7. The computer based method according to claim 6, wherein recording the track of replacement for every edge of $B_p$ comprises:

recording the track of replacement for the seed edge e by initializing sequences I(e)=Ø and S(e)={e}; and recording the track of replacement for each edge e* in the circuit of $T_i$+e' by sequences I(e*)=I(e')i and S(e*)=S(e')e'.

8. The computer based method according to claim 6 wherein expanding the spanning forest $T_k$ further comprises:

letting e' be the edge of $B_p$ joining two unconnected portions of $T_k$ and letting I(e')=$i_1 i_2 \ldots i_{h-1}$ and S(e')=$e_1 e_2 \ldots e_h$ where $e_h$=the seed edge; and setting $T_k \leftarrow T_k$+e' and for each r=1, ..., h−1, setting $T_{i_r} \leftarrow T_{i_r}+e_r-e_{r+1}$.

9. A system for determining a level of relatedness of data within a dataset, comprising:

a computer processor;

a memory in communication with the processor;

an output device in communication with the processor; and a computer readable medium having computer-executable instructions embodied therein for performing a method comprising:

establishing a weighted graph G having a plurality of vertices and a plurality of weighted edges each joining a pair of the vertices, each vertex representing an object of interest and each edge having an integer weight w(e) representing a level of relatedness between the corresponding objects and representing a set of w(e) parallel edges e joining the pair of vertices;

finding, for a given integer k, exactly all possible subgraphs H of G satisfying the following dynamic "edge-to-vertex" ratio:

$$\min_{\forall P} \frac{|E(H/P)|}{|P|-1} > k$$

where the minimum is taken over all possible partitions P of the vertex set of H, and E(H/P) is the set of edges crossing between parts of P;

identifying each subgraph H found as a level-k community if it is maximal, wherein a subgraph H is defined as maximal if there are no larger subgraphs containing it that satisfy the dynamic "edge-to-vertex" ratio for the same k; and outputting, on the output device, all level-k communities, wherein the level of relatedness between all pairs of the objects of interest within each level-k community is greater than k the processor being operable to execute the computer-executable instructions embodied on the computer readable medium.

10. The system of claim 9, wherein the level of relatedness between objects of interest represents a similarity or closeness between the objects of interest.

11. The system of claim 9, wherein finding all possible subgraphs H of G further comprises:
   finding maximal subgraph H that, for every edge e, H−e contains k edge-disjoint spanning trees.

12. The system of claim 9, wherein G is the only level-0 community and finding all possible subgraphs H of G further comprises:
   finding all level-k communities within a previously found level-(k−1) community; and
   repeating the finding step for k←k+1 until only single vertices remain.

13. The system of claim 12, wherein finding all level-k communities within a level-(k−1) community H comprises:
   a) letting $T_1, T_2, \ldots, T_{k-1}$ be edge-disjoint spanning trees of H;
   b) finding a spanning forest $T_k$ in $$H - \bigcup_{i=1}^{k-1} E(T_i);$$

c) finding an edge e that is not used up in the set of $T_i$ for all i=1, ..., k, the edge being a seed edge;
   d) establishing an edge subset $B_p$, starting with p=1, which initially contains the seed edge e;
   e) expanding the subset $B_p$, recursively, for each $T_i$ and each e'∈ $B_p$, by adding all edges e* of any circuit in $T_i$+e';
   f) repeating step (e) until either;
      (Case 1) $B_p$ connects two unconnected portions of $T_k$; or
      (Case 2) $B_p$ does not connect two unconnected portions of $T_k$ and, for every $T_i$ and every e'∈ $B_p$, the circuit in $T_i$+e' contains no edge joining the same vertices as any edge in $B_p$;
   g) if Case 1 of step (f) occurs, adjusting the set of spanning forests $\{T_1, T_2, \ldots, T_k\}$ and expanding the spanning forest $T_k$ and, thereafter, repeating step (c) for the adjusted set of forests $\{T_1, T_2, \ldots, T_k\}$;
   h) if Case 2 of step (f) occurs, storing the subset $B_p$ and setting p←p+1 and repeating step (c) with an edge e that also does not join the same vertices as any edge in any of $B_1, B_2, \ldots B_{p-1}$;
   i) merging $B_p$s that overlap; and
   j) outputting the set of subgraphs induced by stored subsets $B_p$ resulting from step (i), each of which is a level-k community of G and contained in H.

14. The system of claim 13, wherein expanding the forest $T_k$ in step (g) further comprises:
   recording a track of replacement for every edge of $B_p$; and
   following the recording of the track of replacement: adjusting the set of forests $\{T_1, T_2, \ldots, T_k\}$ by adding the seed edge, thereby expanding the spanning forest $T_k$ by connecting unconnected portions of $T_k$.

15. The computer based method according to claim 14, wherein recording the track of replacement for every edge of $B_p$ comprises:
   recording the track of replacement for the seed edge e by initializing sequences I(e)=Ø and S(e)={e}; and
   recording the track of replacement for each edge e* in the circuit of $T_i$+e' by sequences I(e*)=I(e')i and S(e*)=S(e')e'.

16. The system of claim 14, wherein expanding the spanning forest $T_k$ further comprises:
   letting e' be the edge of $B_p$ joining two unconnected portions of $T_k$ and letting I(e')=$i_1 i_2 \ldots i_{h-1}$ and S(e')=$e_1 e_2 \ldots e_h$ where $e_h$=the seed edge; and
   setting $T_k \leftarrow T_k+e'$ and for each r=1, ..., h−1, setting $T_{i_r} \leftarrow T_{i_r}+e_r-e_{r+1}'$.

17. A computer readable medium having computer-executable instructions embodied therein for performing a method of clustering related data representing a plurality of objects of interest and information about levels of relatedness between pairs of the objects, the method comprising:
   establishing on a computer a weighted graph G having a plurality of vertices and a plurality of weighted edges each joining a pair of the vertices, each vertex representing an object of interest and each edge having an integer weight w(e) representing a level of relatedness between the corresponding objects of interest and representing a set of w(e) parallel edges e joining the pair of vertices;
   finding, on the computer, for a given integer k, all possible subgraphs H of G satisfying the following dynamic "edge-to-vertex" ratio:

$$\min_{\forall P} \frac{|E(H/P)|}{|P|-1} > k$$

where the minimum is taken over all possible partitions P of the vertex set of H, and E(H/P) is the set of edges crossing between parts of P;
   identifying each subgraph H found as a level-k community if it is maximal, wherein a subgraph H is defined as maximal if there are no larger subgraphs containing it that satisfy the dynamic "edge-to-vertex" ratio for the same k; and
   outputting from the computer all level-k communities, wherein the level of relatedness between all pairs of the objects of interest within each level-k community is greater than k.

18. The computer readable medium of claim 17, wherein the level of relatedness between objects of interest represents a similarity or closeness between the objects of interest.

19. The computer readable medium of claim 17, wherein finding all possible subgraphs H of G further comprises:
   finding maximal subgraph H that, for every edge e, H−e contains k edge-disjoint spanning trees.

20. The computer readable medium of claim 17, wherein G is the only level-0 community and finding all possible subgraphs H of G further comprises:
   finding all level-k communities within a previously found level-(k−1) community; and
   repeating the finding step for k←k+1 until only single vertices remain.

21. The computer readable medium of claim 20 wherein finding all level-k communities within a level-(k−1) community H comprises:

a) letting $T_1, T_2, \ldots T_{k-1}$ be edge-disjoint spanning trees of H;
b) finding a spanning forest $T_k$ in $$H - \bigcup_{i=1}^{k-1} E(T_i);$$

c) finding an edge e that is not used up in the set of $T_i$ for all i=1, ..., k, the edge being a seed edge;
d) establishing an edge subset $B_p$, starting with p=1, which initially contains the seed edge e;
e) expanding the subset $B_p$, recursively, for each $T_i$ and each $e' \in B_p$, by adding all edges e* of any circuit in $T_i + e'$;
f) repeating step (e) until either;
   (Case 1) $B_p$ connects two unconnected portions of $T_k$; or
   (Case 2) $B_p$ does not connect two unconnected portions of $T_k$ and, for every $T_i$ and every $e' \in B_p$, the circuit in $T_i + e'$ contains no edge joining the same vertices as any edge in $B_p$;
g) if Case 1 of step (f) occurs, adjusting the set of spanning forests $\{T_1, T_2, \ldots, T_k\}$ and expanding the spanning forest $T_k$ and, thereafter, repeating step (c) for the adjusted set of forests $\{T_1, T_2, \ldots, T_k\}$;
h) if Case 2 of step (f) occurs, storing the subset $B_p$ and setting $p \leftarrow p+1$ and repeating step (c) with an edge e that also does not join the same vertices as any edge in any of $B_1, B_2, \ldots B_p$;
i) merging $B_p$s that overlap; and
j) outputting the set of subgraphs induced by stored subsets $B_p$ resulting from step (i), each of which is a level-k community of G and contained in H.

22. The computer readable medium of claim 21, wherein expanding the forest $T_k$ in step (g) further comprises:
   recording a track of replacement for every edge of $B_p$; and
   following the recording of the track of replacement: adjusting the set of forests $\{T_1, T_2, \ldots, T_k\}$ by adding the seed edge, thereby expanding the spanning forest $T_k$ by connecting unconnected portions of $T_k$.

23. The computer readable medium of claim 22, wherein recording the track of replacement for every edge of $B_p$ comprises:
   recording the track of replacement for the seed edge e by initializing sequences $I(e) = \emptyset$ and $S(e) = \{e\}$; and
   recording the track of replacement for each edge e* in the circuit of $T_i + e'$ by sequences $I(e^*) = I(e')i$ and $S(e^*) = S(e')e'$.

24. The computer readable medium of claim 22, wherein expanding the spanning forest $T_k$ further comprises:
   letting e' be the edge of $B_p$ joining two unconnected portions of $T_k$ and letting $I(e') = i_1 i_2 \ldots i_{h-1}$ and $S(e') = e_1 e_2 \ldots e_h$ where $e_h$=the seed edge; and
   setting $T_k \leftarrow T_k + e'$ and for each r=1, ..., h−1, setting $T_{i_r} \leftarrow T_{i_r} + e_r - e_{r+1}$.

\* \* \* \* \*

UNITED STATES PATENT AND TRADEMARK OFFICE
CERTIFICATE OF CORRECTION

PATENT NO. : 7,523,117 B2
APPLICATION NO. : 11/416766
DATED : April 21, 2009
INVENTOR(S) : Cun-Quan Zhang et al.

Page 1 of 1

It is certified that error appears in the above-identified patent and that said Letters Patent is hereby corrected as shown below:

Col. 4, line 20: replace "$B_pS$" with --$B_ps$--
Col. 12, line 67: replace "$\leq$" with --<--
Col. 15, line 28: replace "(wherein" with --(wherein--
Col. 20, line 52: replace "()" with --(1)--
Col. 41, line 30: replace "$B_2,...B_p$" with --$B_2,...B_{p-1}$--

Signed and Sealed this

Thirtieth Day of June, 2009

JOHN DOLL
*Acting Director of the United States Patent and Trademark Office*